Aug. 24, 1965   H. W. CHAPMAN ETAL   3,202,111
FREIGHT BRACING APPARATUS
Original Filed Sept. 21, 1954   15 Sheets-Sheet 1

INVENTORS.
Harvey W. Chapman.
Henry L. Dunlap, Deceased
by Myrtle Estella Dunlap,
Special Administratrix
BY Carness, Dickey & Pierce.
ATTORNEYS.

Aug. 24, 1965   H. W. CHAPMAN ETAL   3,202,111
FREIGHT BRACING APPARATUS

Original Filed Sept. 21, 1954   15 Sheets-Sheet 2

INVENTORS.
Harvey W. Chapman
Henry L. Dunlap, Deceased
by Myrtle Estella Dunlap,
Special Administratrix
BY Carmen, Dickey & Pierce
ATTORNEYS

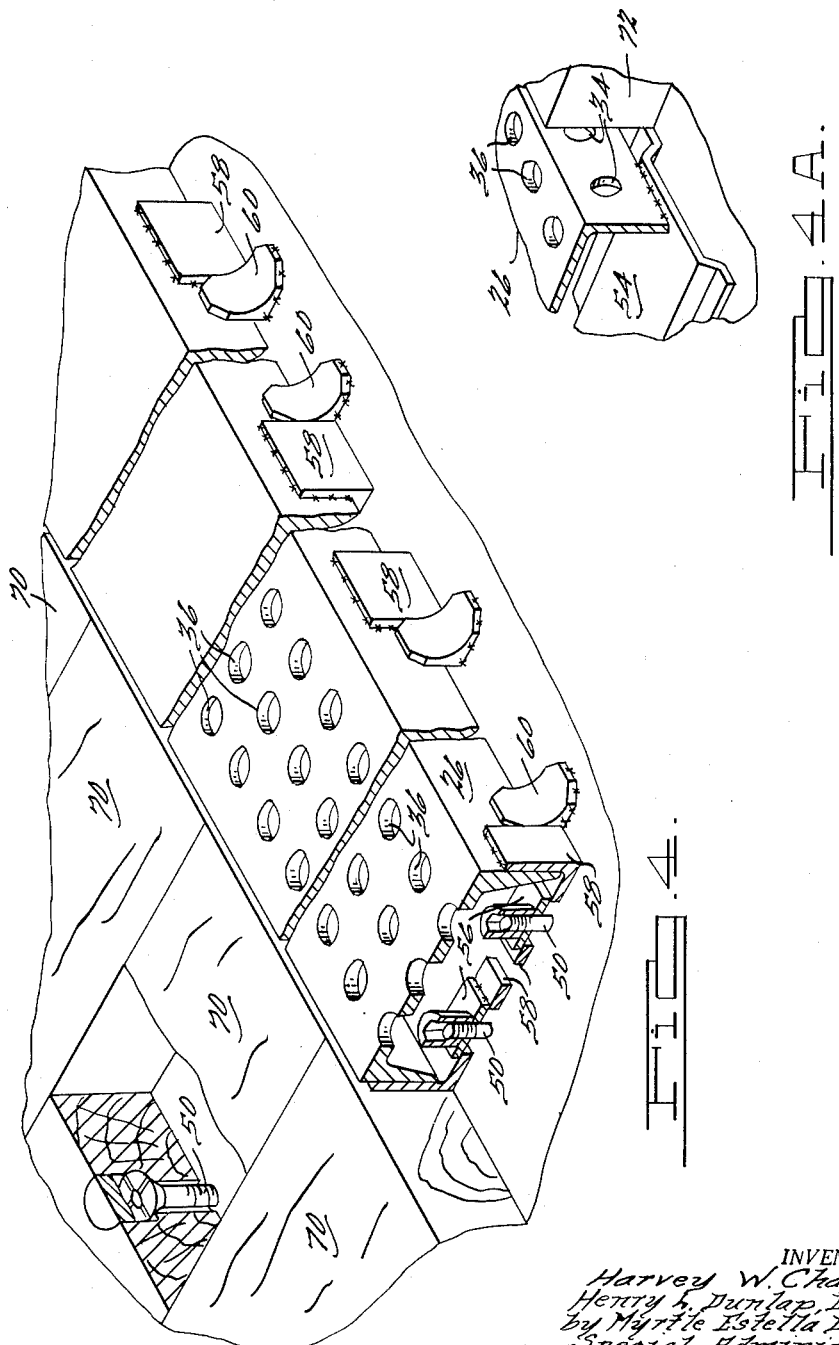

Aug. 24, 1965  H. W. CHAPMAN ETAL  3,202,111
FREIGHT BRACING APPARATUS
Original Filed Sept. 21, 1954  15 Sheets-Sheet 4
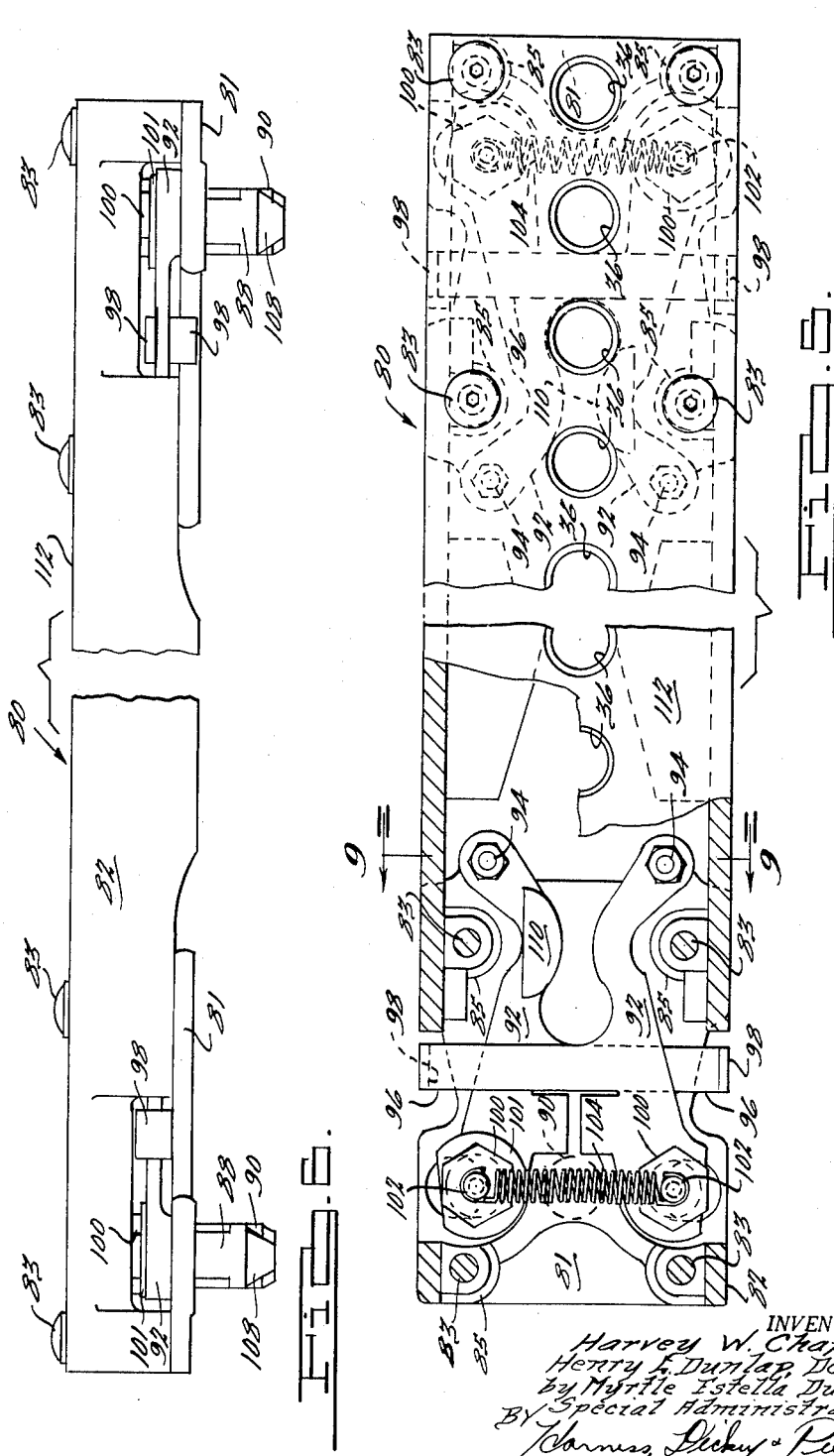

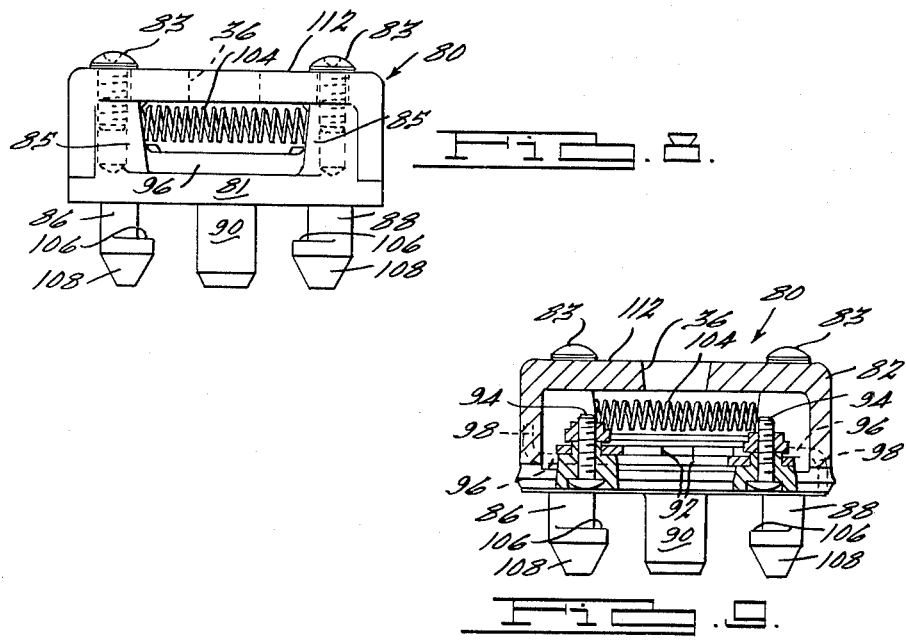
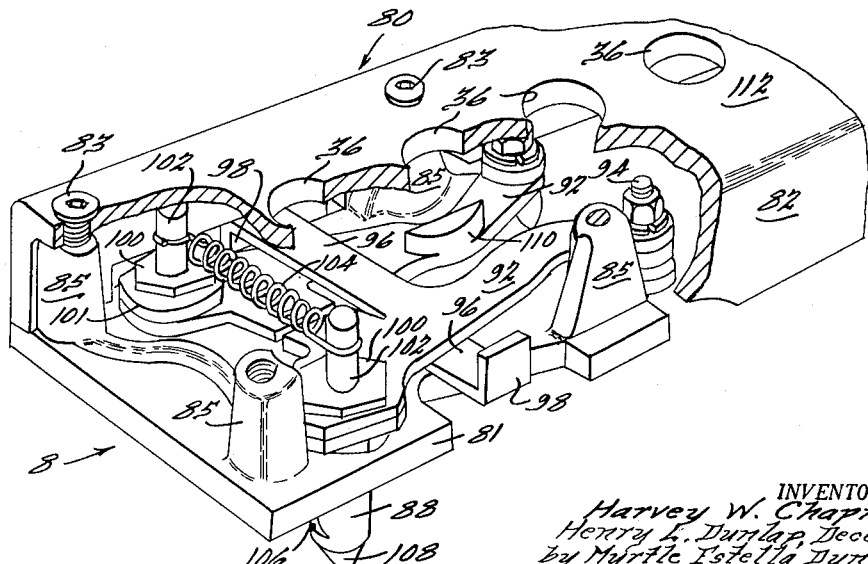

Aug. 24, 1965       H. W. CHAPMAN ETAL       3,202,111
FREIGHT BRACING APPARATUS
Original Filed Sept. 21, 1954                    15 Sheets-Sheet 6
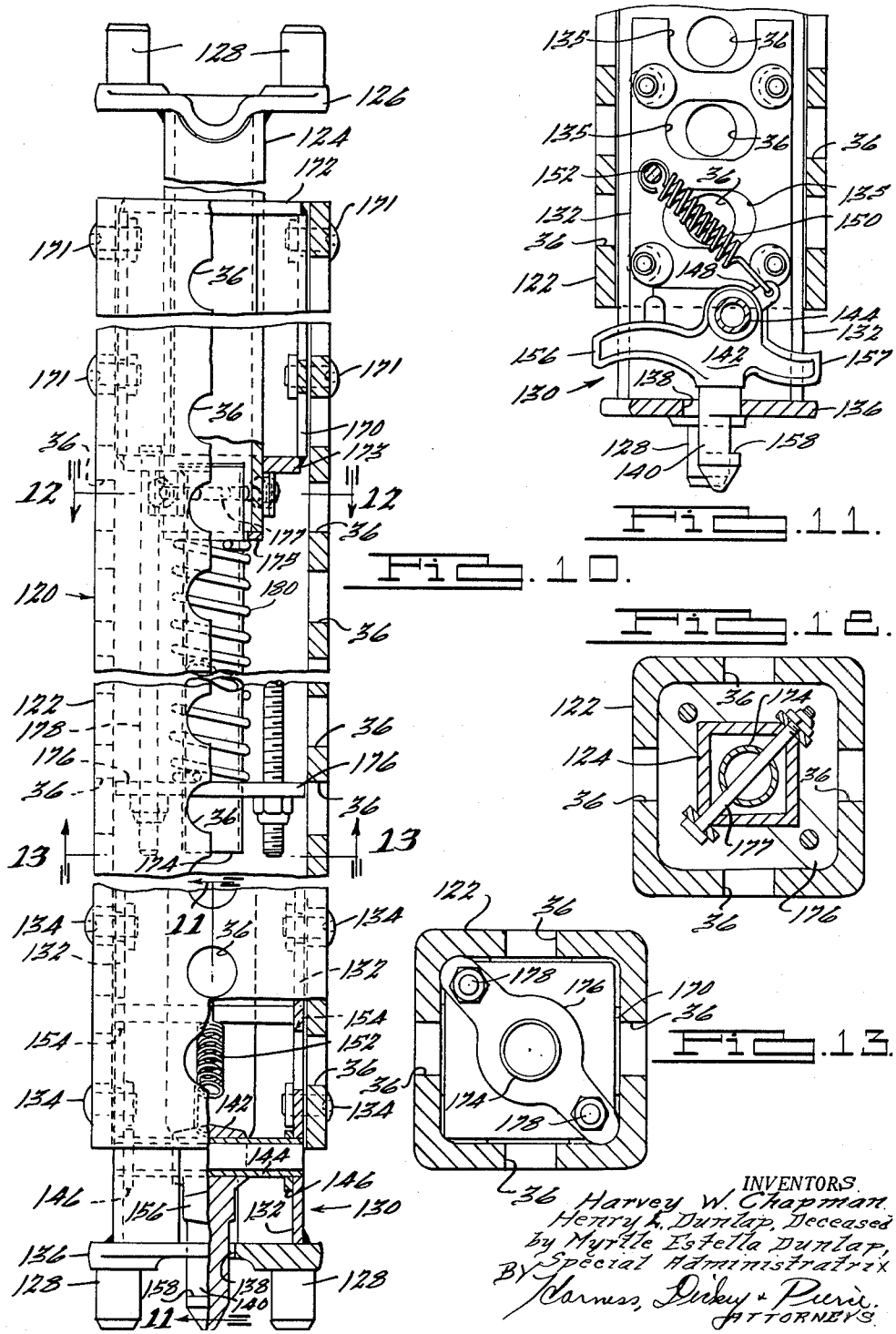

Aug. 24, 1965  H. W. CHAPMAN ETAL  3,202,111
FREIGHT BRACING APPARATUS
Original Filed Sept. 21, 1954  15 Sheets-Sheet 7
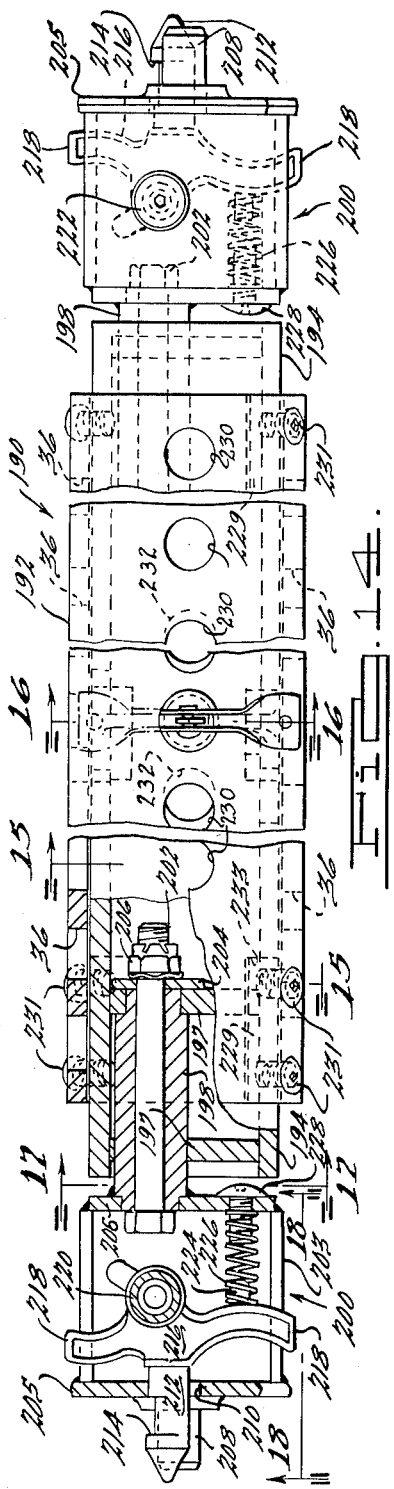
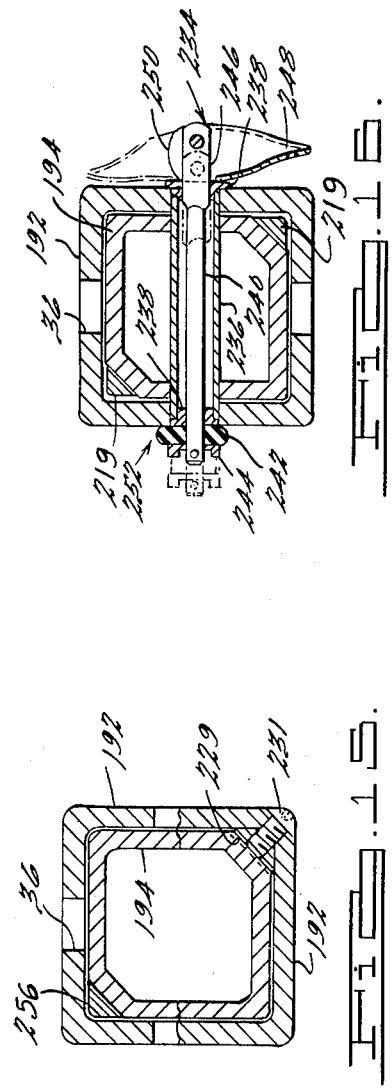
INVENTORS
Harvey W. Chapman
Henry L. Dunlap, Deceased
by Myrtle Estella Dunlap,
Special Administratrix
BY Harness, Dickey & Pierce
ATTORNEYS Aug. 24, 1965    H. W. CHAPMAN ETAL    3,202,111
FREIGHT BRACING APPARATUS
Original Filed Sept. 21, 1954    15 Sheets-Sheet 8
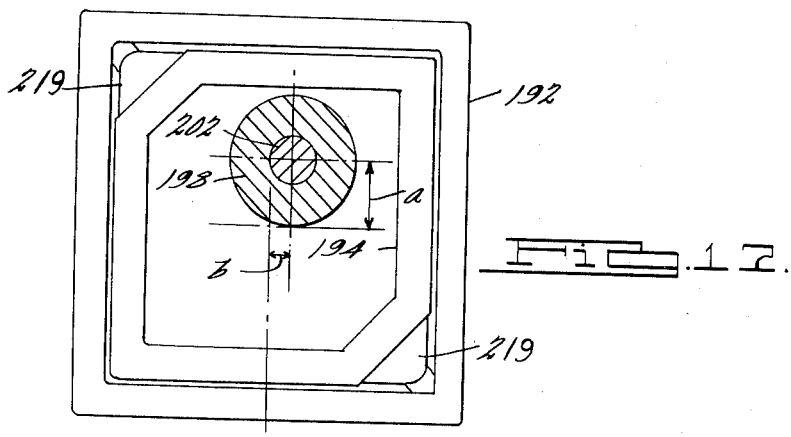
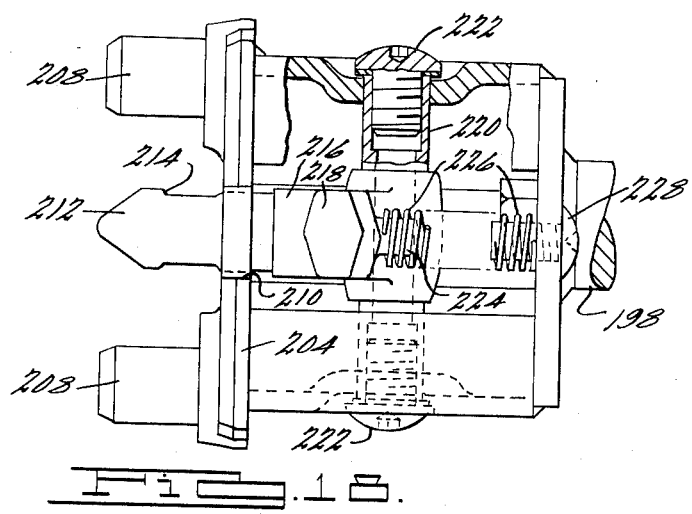
INVENTORS
Harvey W. Chapman
Henry L. Dunlap, Deceased
by Myrtle Istella Dunlap,
BY Special Administratrix
Barnes, Dickey & Pierce.
ATTORNEYS

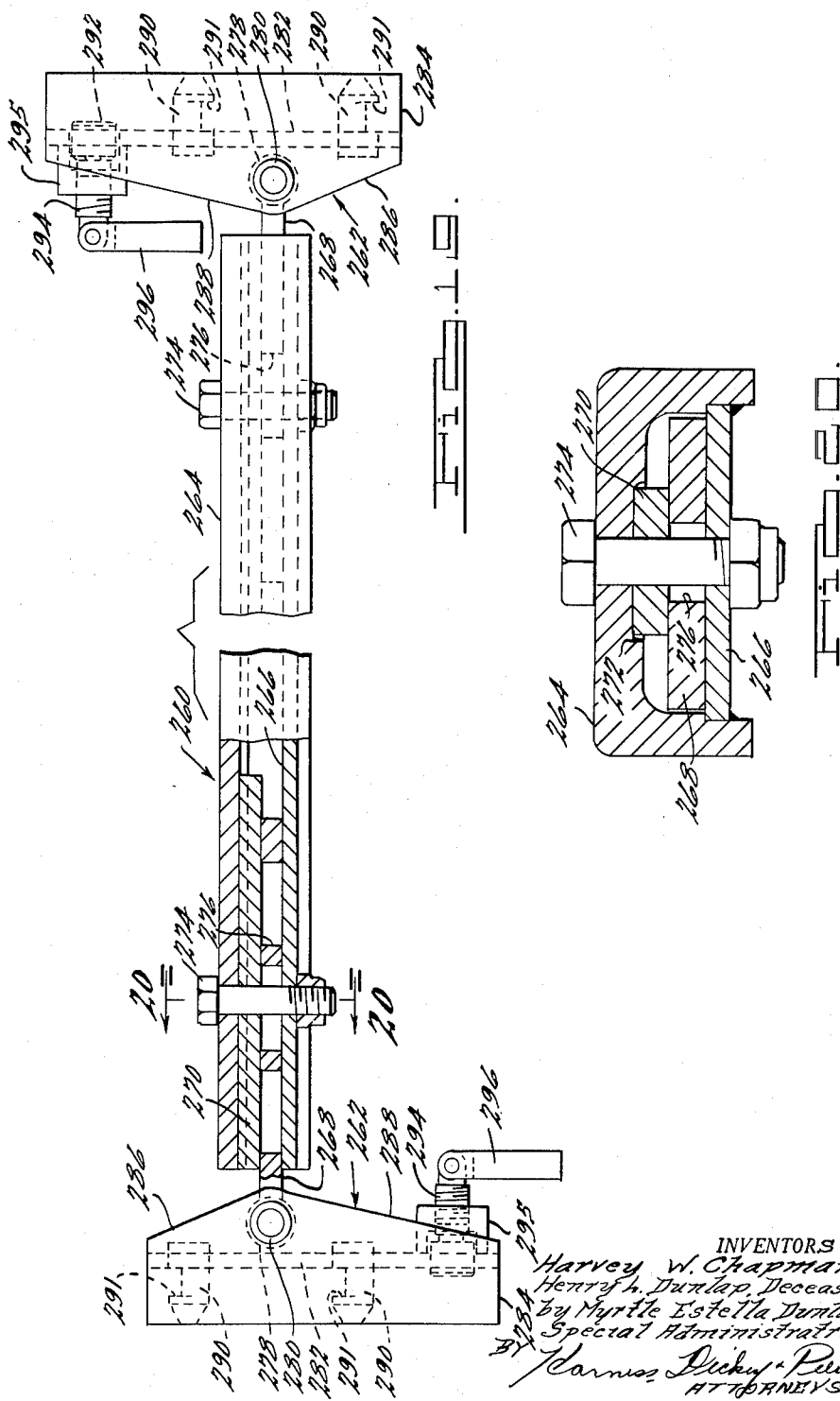

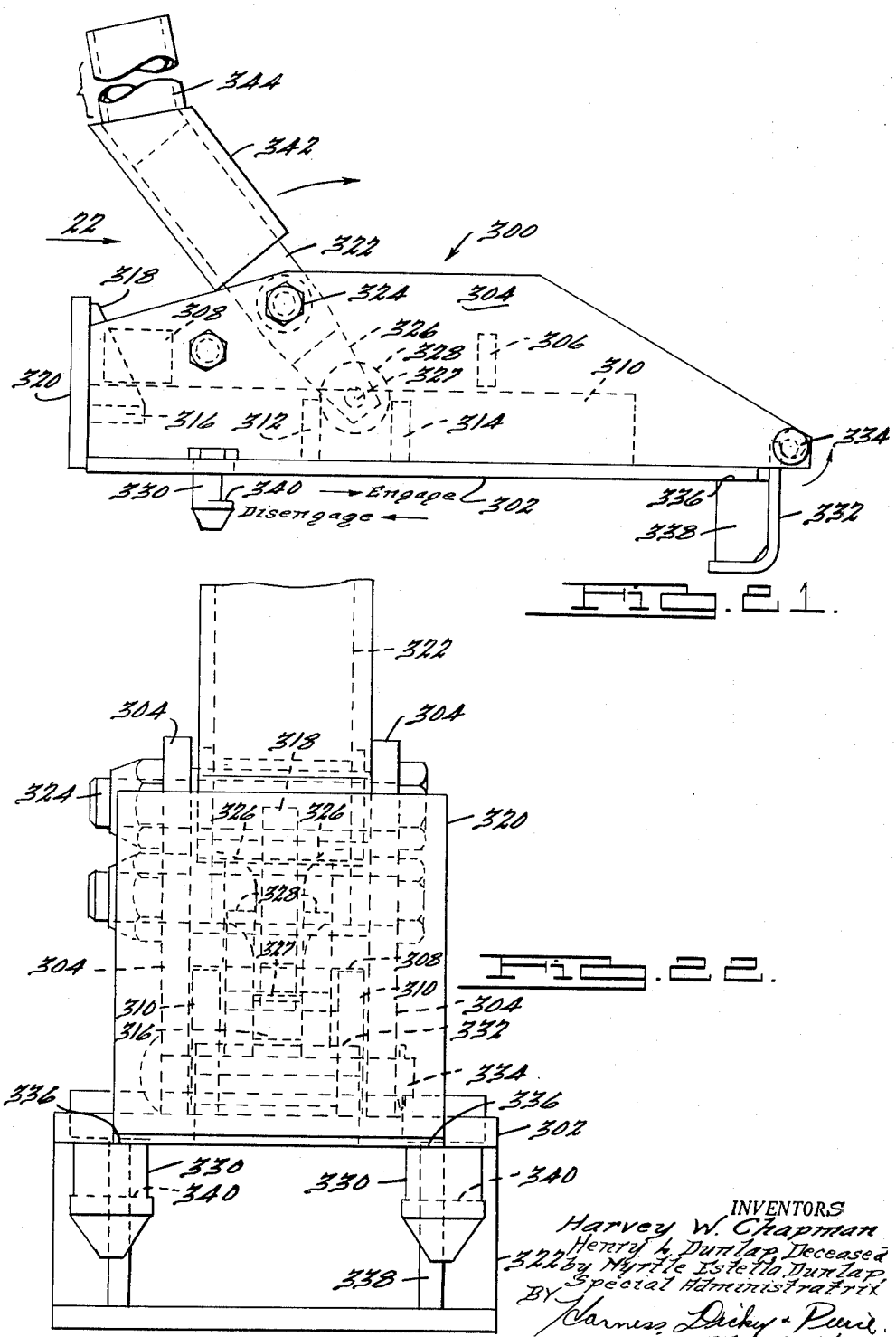
Aug. 24, 1965    H. W. CHAPMAN ETAL    3,202,111
FREIGHT BRACING APPARATUS
Original Filed Sept. 21, 1954    15 Sheets-Sheet 10

Aug. 24, 1965  H. W. CHAPMAN ETAL  3,202,111
FREIGHT BRACING APPARATUS
Original Filed Sept. 21, 1954  15 Sheets-Sheet 11

INVENTORS
Harvey W. Chapman,
Henry E. Dunlap, Deceased
by Myrtle Istella Dunlap,
Special Administratrix
BY Harness, Dickey & Pierce
ATTORNEYS Aug. 24, 1965    H. W. CHAPMAN ETAL    3,202,111
FREIGHT BRACING APPARATUS
Original Filed Sept. 21, 1954    15 Sheets-Sheet 12
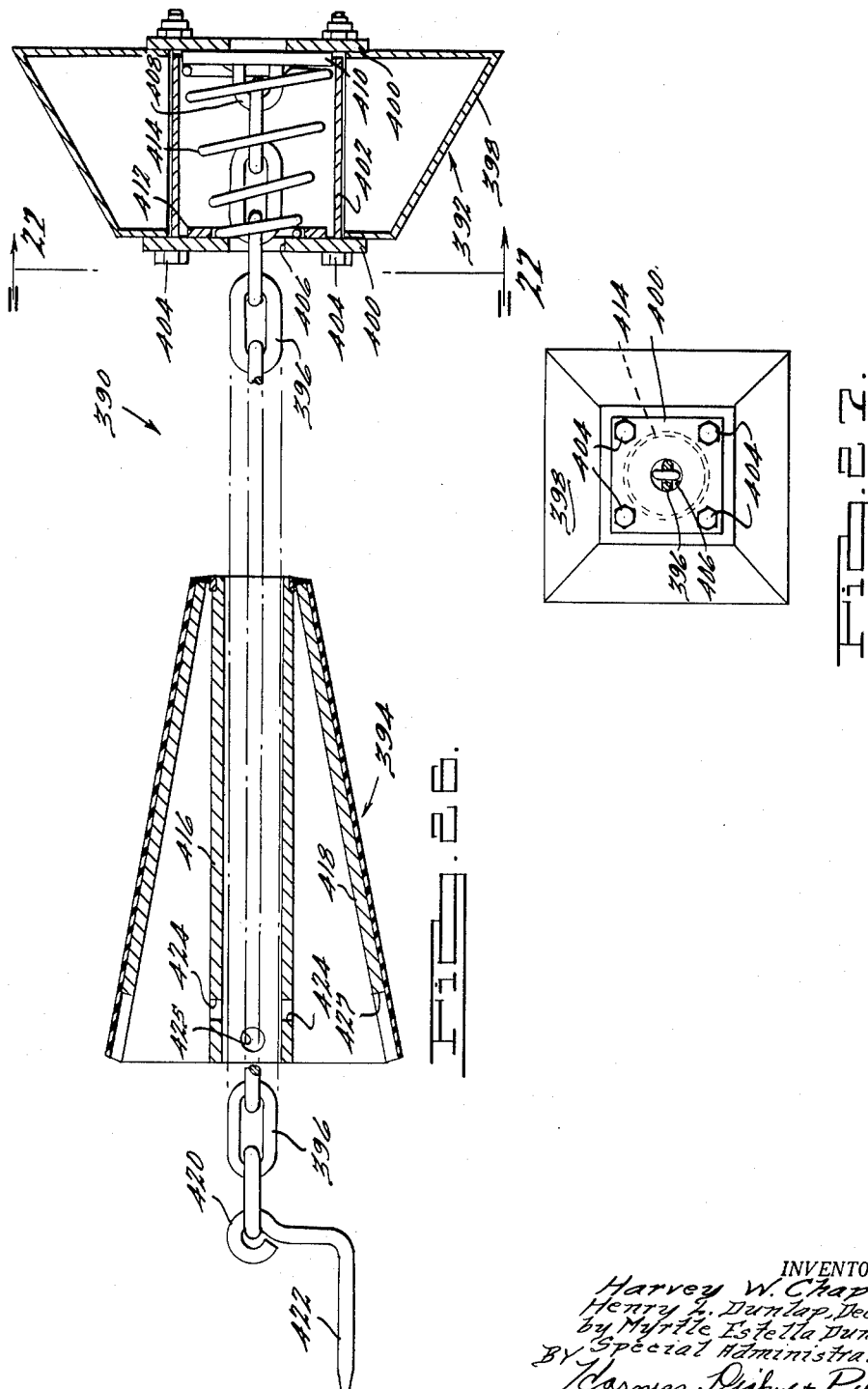
INVENTORS
Harvey W. Chapman
Henry J. Dunlap, Deceased
by Myrtle Estella Dunlap,
Special Administratrix
BY Carness, Dickey + Pierce
ATTORNEYS Aug. 24, 1965   H. W. CHAPMAN ETAL   3,202,111
FREIGHT BRACING APPARATUS
Original Filed Sept. 21, 1954                15 Sheets-Sheet 13
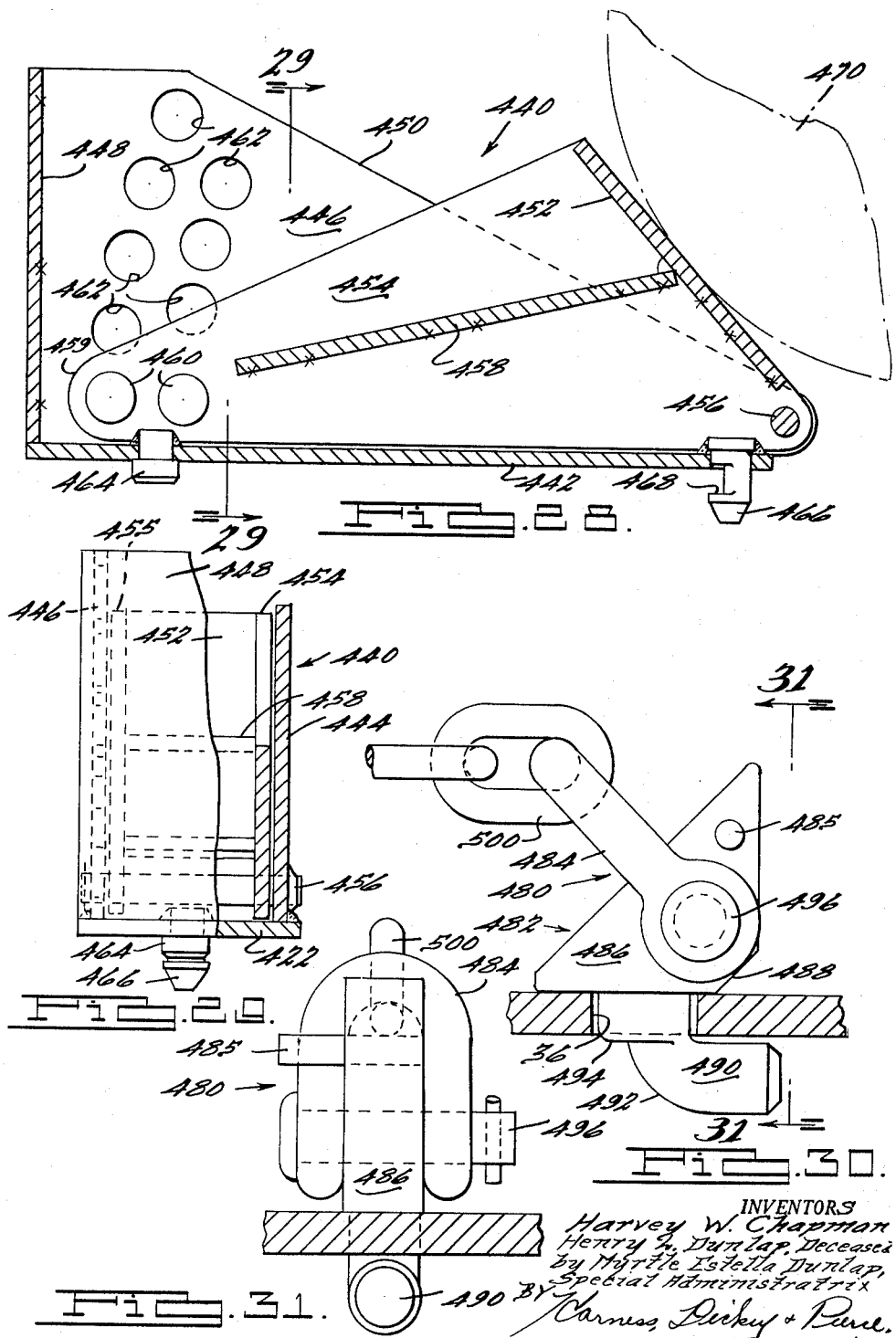

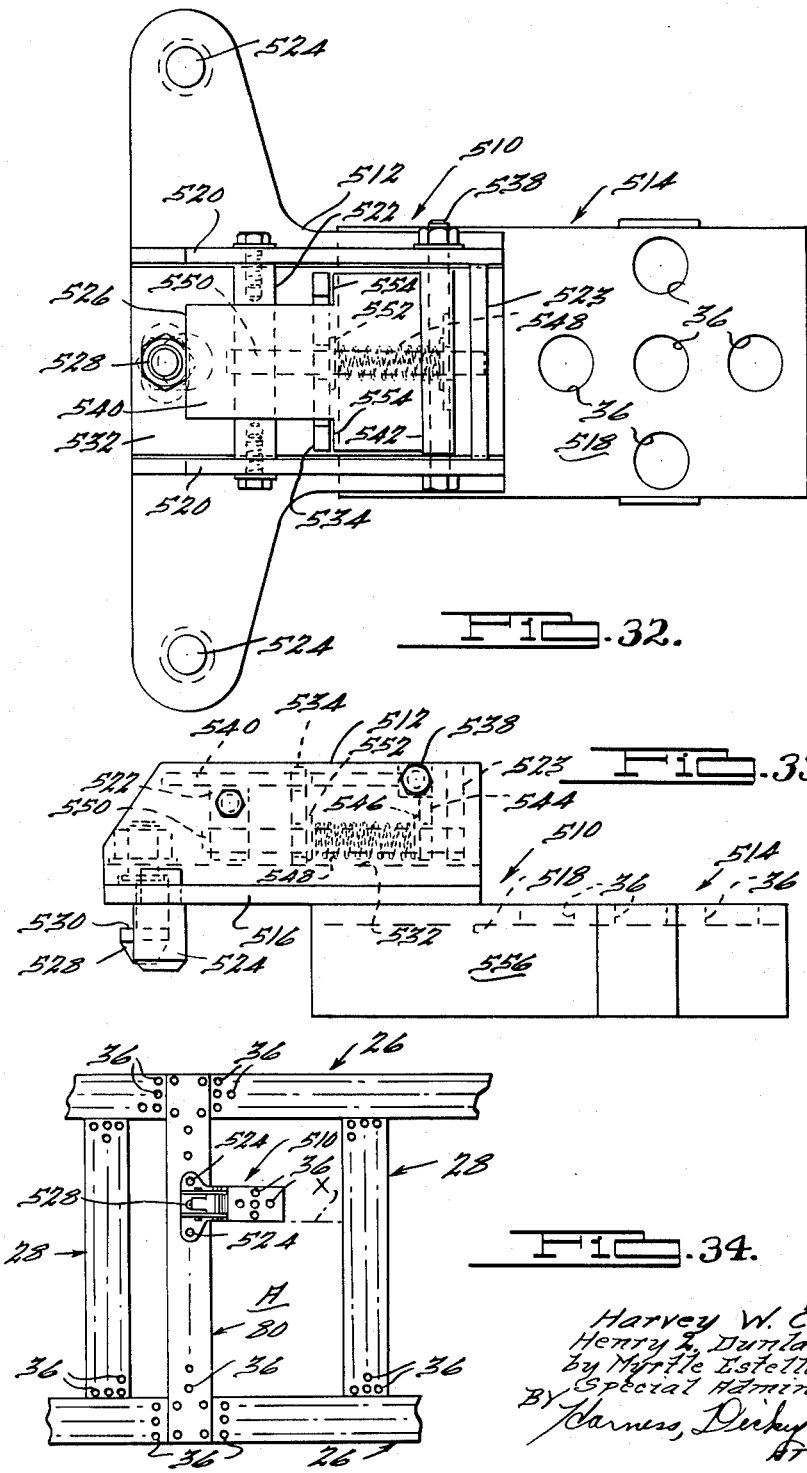

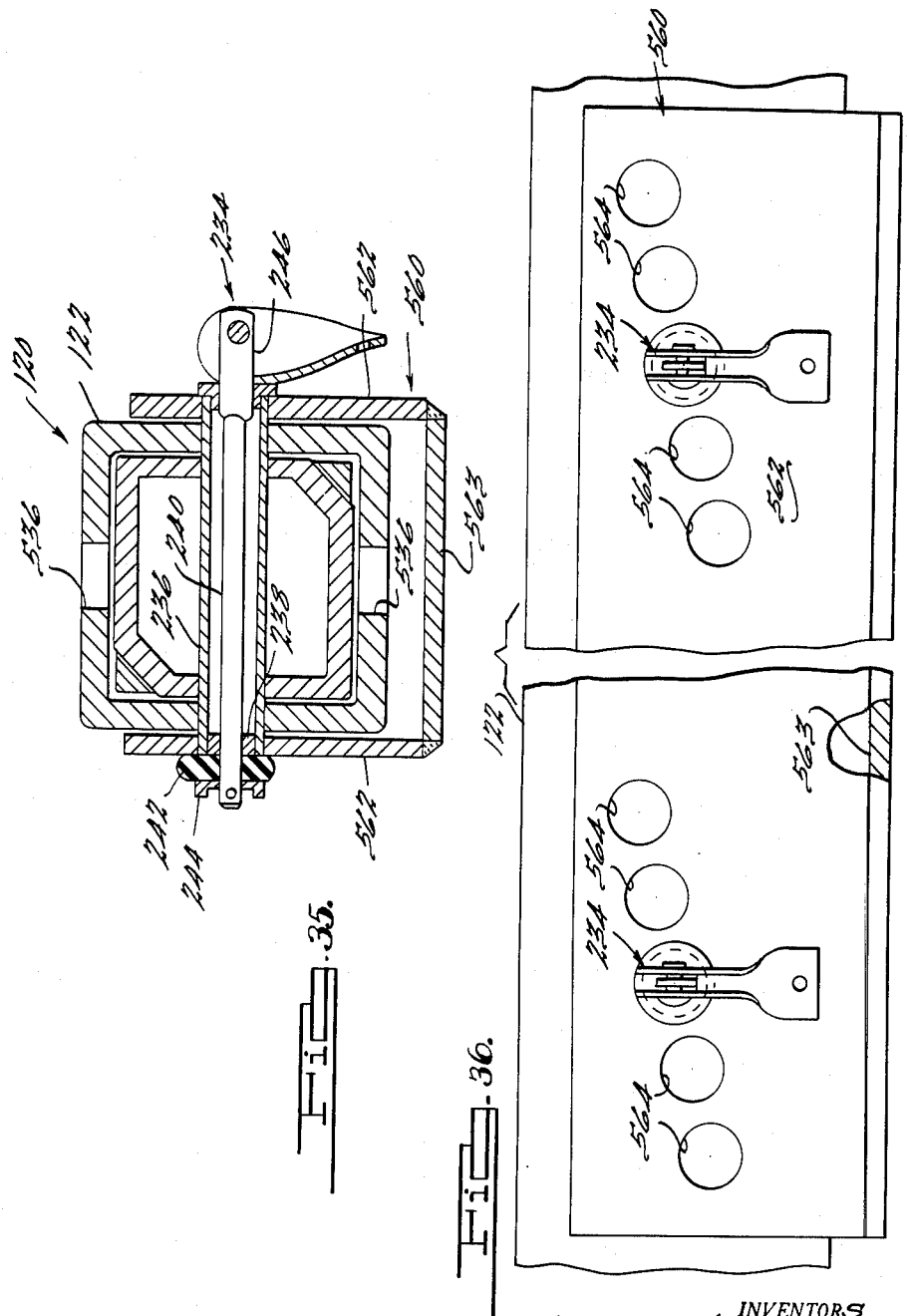

United States Patent Office 3,202,111
Patented Aug. 24, 1965

3,202,111
FREIGHT BRACING APPARATUS
Harvey W. Chapman, Detroit, Mich., and Henry L. Dunlap, deceased, late of Dearborn, Mich., by Myrtle Estella Dunlap, special administratrix, Dearborn, Mich., assignors to Evans Products Company, Plymouth, Mich., a corporation of Delaware
Application Sept. 11, 1957, Ser. No. 683,285, which is a division of application Ser. No. 457,474, Sept. 21, 1954, now Patent No. 2,834,304, dated May 13, 1958. Divided and this application July 3, 1962, Ser. No. 207,866
2 Claims. (Cl. 105—369)

This application is a divisional application of copending application Serial No. 683,285, filed September 11, 1957, now abandoned which was a division of our application Serial No. 457,474, filed September 21, 1954, now Patent No. 2,834,304.

The present invention relates to the loading, stowage and securing of freight in ships, warehouses, freight cars and trucks, and other freight storage and freight hauling equipment. More specifically, the invention relates to freight loading equipment adapted for permanent installation and especially adapted to the stowage of palletized loads. Most specifically, the invention relates to permanently installed apparatus, dunnage and other equipment for the stowage of ammunition and other dangerous cargo in the holds of ships, which equipment is especially designed to expedite the breaking out of portions of the cargo, without disturbing unwanted cargo, while under way at sea.

At the present time freight, especially dangerous freight such as ammunition, has been loaded into ships, freight cars, trucks, etc., and secured by wooden framework laboriously erected by hand as loading progresses. In ships all freight, whether explosive or not, must be secured against shifting when the vessel rolls or pitches while under way at sea. The cleats, diagonal braces, frameworks, blocks, wedges, etc. used for this purpose are wasteful of space, seldom can be re-used and nearly always have to be tailored or re-arranged for each load. Freight stowed in this manner is difficult to break out for unloading without disturbing that portion of cargo not to be unloaded. In ships used for transfer of cargo at sea, especially when under way, the breaking out of the cargo is the major hold-up in the operation. As a result, the cargo to be transferred usually has been broken out in advance of the transfer operation and hauled out on deck where it was exposed to the weather and enemy action and free to slide about with the roll of the ship. With ammunition, this has been most dangerous.

Whatever the type of freight hauling vehicle, whether it be a ship, a freight car, or a truck, or a storage area such as a warehouse, it would be advantageous to pack the freight on pallets, handle it on pallets, stow the freight in palletized form and unload it still on the original pallet. In ships especially, until the present, there was no convenient way to stow and safely secure palletized freight without resort to temporary wooden dunnage. The latter is usually disposed of because, if it is not needed, it presents a serious stowage problem. With sea transfer ships, the wooden dunnage cannot be disposed of while under way because it would leave a trail hundreds of miles long.

It is a principal object, therefore, to provide freight loading apparatus for permanent installation which will safely secure any type of freight and which permits quick and easy breakout of any portion of the cargo.

Another important object of this invention is to provide freight loading apparatus including portable, removable self-stowing dunnage members.

Still another important object is to provide freight loading apparatus using a combinaiton of fixed and portable members which are of standard dimensions enabling the planning of the load before actual loading begins, yet which embody such flexibility that unexpected variations in freight dimensions or variations hold dimensions from ship to ship can easily be accommodated.

Another important object of this invention is to provide freight loading apparatus which conserves space, provides greater accessibility, and simplifies re-bracing of the load after a portion has been removed.

Yet another object is to provide freight loading apparatus employing standard members which are capable of highly specialized applications such as the stowing and securing of munitions ranging from the smallest crated or palletized types to the largest individually loaded bombs and shells.

Other objects and advantages will be apparent, or will become apparent, in the following more detailed description of the invention, especially when taken in conjunction with the accompanying drawings in which:

FIGURE 4 is a perspective view similar to FIGURES 2 and 3 showing a third manner of installing the permanent deck members, this method utilizing angle guides, angle brackets and seat plates;

FIGURE 4A is a fragmentary view in perspective showing the manner in which a channel-shaped longitudinal deck member may be secured to the deck and removable horizontal deck members and planking secured thereto;

FIGURE 5 is a plan view, with portions broken away and in section, of a portable deck member intended to be secured over the top of the permanent deck members of FIGURES 1 to 4 in order to locate a bracing structure at intermediate points within the sides of the gridlike pattern;

FIGURE 6 is a side elevation of the portable deck member of FIGURE 5;

FIGURE 7 is a perspective view, with portions broken away, of one end of the portable deck member of FIGURES 5 and 6, and showing in particular the latching mechanism installed on both ends of such member;

FIGURE 8 is an end view of the portable deck member of FIGURES 5 to 7, the view being taken in the direction of the arrow 8 of FIGURE 7;

FIGURE 9 is a cross sectional view of the portable deck member of FIGURES 5 to 8, the section being taken along the line 9—9 of FIGURE 5;

FIGURE 10 is a side elevational view, with portions broken away and in section, showing a telescoping vertical freight bracing member such as is shown in FIGURES 1 to 4, erected on the gridlike pattern of holes in the deck members;

FIGURE 11 is a fragmentary longitudinal section through the latch-locking end of the vertical bracing member of FIGURE 10, the section being defined between the arrows 11, 11 of FIGURE 10;

FIGURE 12 is a cross sectional view of the vertical bracing member of FIGURE 10, the section being along the line 12—12 of FIGURE 10;

FIGURE 13 is another cross sectional view of the vertical bracing member of FIGURE 10, the section being taken along the line 13—13 of FIGURE 10, showing in particular the manner of securing the ends of the telescope spring mechanism;

FIGURE 14 is a side elevational view, with portions broken away and in section, of a tomming member (horizontal freight brace) such as is shown erected in FIGURE 1;

FIGURE 15 is a cross sectional view of the square central body portion of the tomming member of FIGURE 14, the section being taken along the line 15—15 of FIGURE 14;

FIGURE 16 is a cross sectional view showing the lock pin assembly of the tomming member of FIGURE 14, the section being taken along the line 16—16 of FIGURE 14;

FIGURE 17 is a cross sectional view through one end of the tomming member showing the offset nature of the mounting of the latch member;

FIGURE 18 is an enlarged view, with portions broken away and in section, of one of the latch ends of the tomming member of FIGURES 14 to 17, the portion enlarged being indicated by the line 18—18 of FIGURE 14;

FIGURE 19 is a side elevational view, with portions broken away and in section, of a pivotable adjustable short bracing member intended for horizontal, oblique or vertical bracing between adjacent vertical bracing members and/or horizontal tomming members;

FIGURE 20 is a cross sectional view of the pivotable bracing members of FIGURE 19, showing in particular the extension members, the section being taken on the line 20—20 of FIGURE 19;

FIGURE 21 is a side elevational view of a cargo jack for use in loading freight with the apparatus of FIGURES 1 to 20, showing in particular the manner in which it is secured in the holes in the permanent, removable or portable deck members;

FIGURE 22 is an end view of the cargo jack of FIGURE 21, the figure being viewed in the direction of the arrow 22 of FIGURE 21;

FIGURE 26 is a side elevational view of an adjustable chain-type bomb wedge assembly for use in connection with the vertical and horizontal bracing members of the foregoing drawings, the wedge of this figure likewise being used to snug bombs or shells in racks, the figure showing in particular a rubber-or-plastic-coated, tapered bomb contacting insulator;

FIGURE 27 is an end view, partially in section, of the inner end of the bomb wedge of FIGURE 26, the figure being viewed along the line 27—27 of FIGURE 26;

FIGURE 28 is a side elevational view in section of an adjustable bomb chock assembly for use with the permanent, removable or portable deck members and the vertical and horizontal bracing members of the foregoing drawings, the figure showing in particular the deck anchor pins for insertion in the holes in the deck or bracing members;

FIGURE 29 is an end view partially in section of the bomb chock of FIGURE 28, the section being viewed as if taken substantially along line 29—29 of FIGURE 28;

FIGURE 30 is a side elevational view, with portions broken away and in section, of a hook and shackle assembly for use in securing chains or cables in the deck or bracing members of the foregoing drawings;

FIGURE 31 is an end or transverse view of the hook and shackle assembly of FIGURE 30, the figure being viewed along the line 31—31 of FIGURE 30;

FIGURE 32 is a plan view of an auxiliary, portable T-shaped deck or overhead member for use in erecting verticle bracing members at points within a grid unit;

FIGURE 33 is a side view of the members of FIGURE 32;

FIGURE 34 is a diagrammatic plan view showing one manner of using the member of FIGURES 32 and 33;

Figure 1:
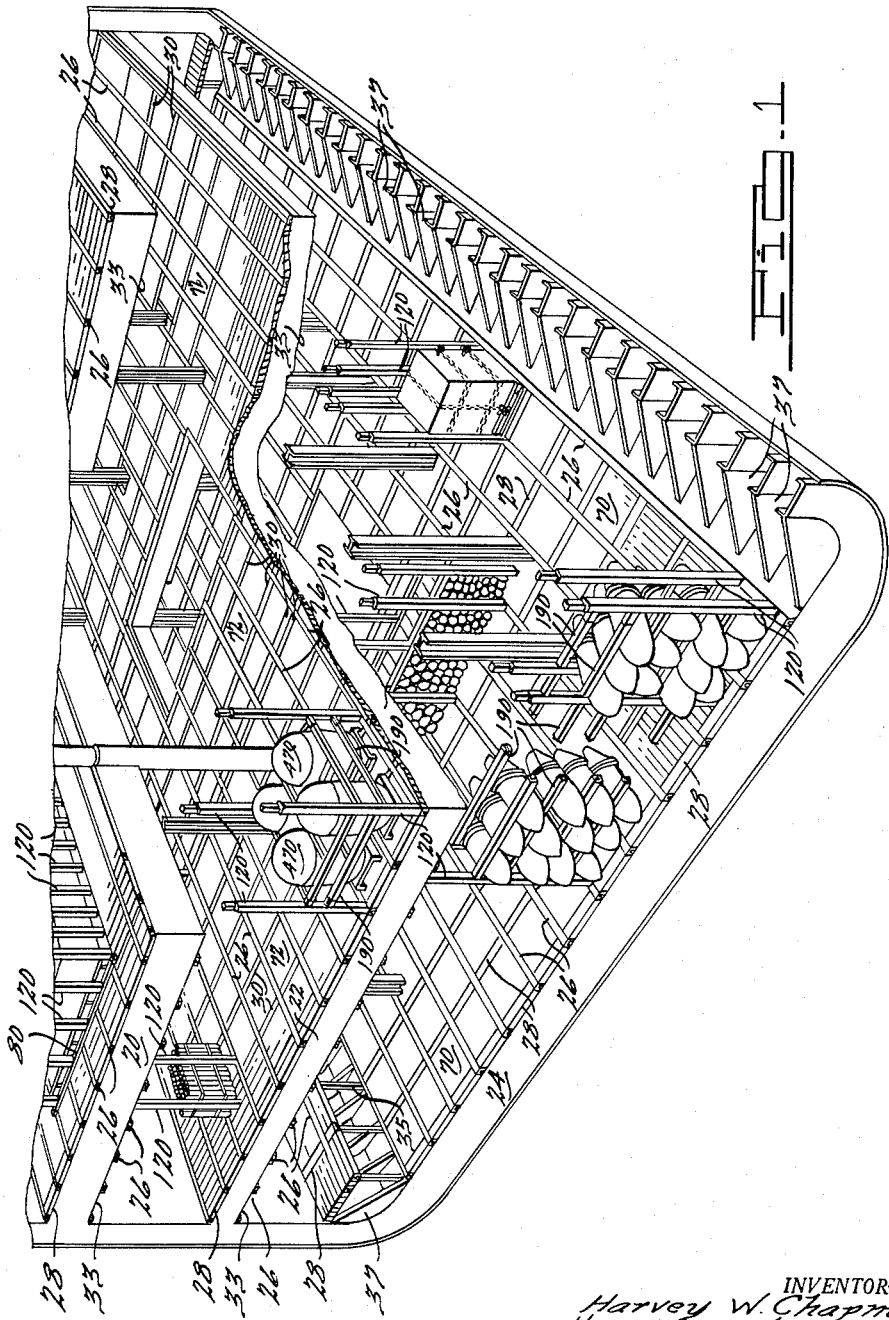
FIGURE 1 is a perspective view with portions broken away of one hold of a cargo ship in which the freight loading apparatus of this invention is installed, and showing in particular the various manners in which the apparatus may be utilized to secure various kinds of freight.

FIGURE 35 is a sectional view through the vertical bracing member of FIGURES 10 to 13 and showing attached thereto an adjustable snugging member to enable the bracing member to support the cargo in situations where it is not possible or practical to correctly position a vertical bracing member; and, FIGURE 36 is a fragmentary side view of the adjustable snugger of FIGURE 35, showing in particular one arrangement of holes provided for adjustability.

In accordance with the present invention, there has been provided a freight loading apparatus intended for more or less permanent installation in a freight transporting vehicle such as a ship, freight car, or truck, or warehouse and the like, which apparatus comprises a grid of fixed and/or removable deck members of structural metal assembled on a freight supporting or other surface, preferably though not necessarily arranged in a square or rectangular pattern and disposed parallel or at an angle with the confining walls or surfaces and obstructions and other inpedimenta so as to make the most efficient use of the surface area available; a matching gridlike pattern of structural metal deck members supported in a substantially parallel alignment on the overhead above that on the freight supporting surface or opposed to the other surface, the members of each grid pattern having on their juxtaposed exposed surfaces, at least, a pattern of aligned holes; portable deck members having a pattern of holes in an exposed surface and which span at least one unit of the gridlike pattern of deck and overhead members to serve as bulkhead anchors, etc. and as a base for the erection of bracing members at nearly any point within the pattern unit; and telescopically adjustable, vertical and horizontal freight bracing members likewise having a pattern of holes on their surfaces, which bracing members are adapted to be erected on or between the opposed gridlike patterns by locking in the holes therein, together with auxiliary equipment such as T-shaped portable auxiliary members having a pattern of holes to assist in erection of vertical members any place on the surface, pivotable auxiliary bracing members for horizontal, oblique or vertical bracing between deck members and/or vertical or horizontal freight bracing members; a movable trolley or crane adapted to be locked into overhead pattern holes, a cargo jack which is anchored to the gridlike pattern of holes in the deck; and other permanent or re-usable dunnage items such as quickly attached and detached chock assemblies, wedge assemblies and hook and shackle assemblies adapted to co-operate with the gridlike pattern of holes in the deck and bracing members to anchor or secure freight of any size or shape. The freight loading apparatus facilitates loading because the use of standardized units permits the planning of loads in advance (and eliminates the skilled hand labor usually involved in installation of wooden framing and dunnage), yet such planning is not upset by wide variations in crate sizes, pallet sizes or ship-to-ship hold size variations, permits maximum accessibiltiy, facilitates break-out of portions of cargo, and is self-stowing when not in use. The apparatus permits an almost endless number of combinations or groupings of members to secure any type, size, shape or weight of freight due to the ability to erect verticals any place on the deck or freight supporting surface. Maximum utilization of the stowage volume is provided due to the ease of vertical stacking. For dangerous cargo, such as ammunition, special racks, frames, bulkheads, bins and the like may be erected with the mechano-like bracing and securing members to provide an extra margin of safety against shifting or collapse of the stowed cargo. The stowage and securing of palletized cargo is especially facilitated by the freight loading apparatus of this invention.

The installation of the freight loading apparatus of this invention is described herein as having been installed on a cargo vessel since the requirements of marine use are the most rigorous and complex of any mode of freight transport. It is to be understood, however, that the apparatus is equally applicable to other freight transporting vehicles and to warehouses and other freight storage areas. In FIGURE 1 there is shown a perspective view of one hold of an ocean-going freighter, the hold being under the main deck and having a second deck (not shown), a third deck 20 below the second deck, a first platform 22 below the third deck 20 and an inner bottom 24 below the first platform. On the third deck and inner bottom, there is somewhat schematically illustrated a gridlike pattern of deck and overhead members including parallel longitudinal structural metal members 26 running lengthwise of the ship and short horizontal structural member 28 extended across or between the longitudinal, both types of deck members being fixed to the deck by any of the methods illustrated in FIGURES 2 to 4A. On the first platform 22 there is shown a slightly different, alternative arrangement of deck members wherein there are, as on the third deck 20 and inner bottom 24, longitudinal structural metal members 26 extending fore and aft of the ship and removable transverse or horizontal deck members 30 (see FIG. 3) which have spring-biased clevis latch pins 32 on their ends for insertion into and locking with any of a pattern of holes 34 on the sides of the fixed longitudinal deck members 26. In both cases the longitudinal 26 and horizontal 28, 30 deck members are preferably arranged to form squares.

In both of the gridlike pattern systems illustrated in FIGURE 1 the gridlike deck pattern is duplicated on the overhead surface 33 and on a framework 35 over the bottom gussets 37 so that the opposed members of each pattern are in accurate alignment. In both arrangements of deck members 26, 28 (or 30), their exposed surfaces (see FIGURES 2 to 4) have at least two, and preferably three, lines of holes 36 in which the distance between lines and holes are, preferably, though not necessarily, the same. This provides a gridlike pattern of holes in deck and overhead in any pair of which various types of self-locking bracing members, cargo jacks, chock assemblies, wedge assemblies and chain and cable hook and shackle assemblies may be secured. Any of the latter may be inserted in a group of holes in one line or across the lines in adjacent, aligned holes. As will be pointed out in greater detail in conjunction with FIGURES 4 to 9, portable deck members 80 are provided, which have a length enabling them to span the grid in either direction, which are locked into holes to serve as bulkhead stops, as a base for verticals and as an anchor for racks, chocks, wedges, jacks, etc., at any intermediate point within the sides of the square of the deck grid. This enables the erection of verticals at nearly any position on the freight loading surface.

As will be more clearly described in connection with FIGURES 10 to 13, the vertical or upright bracing members 120 have on all four sides a pattern of lines or a line of holes 36 arranged on the same center distance pattern as those of the deck members 26, 28 or 30. This permits the insertion of horizontal self-locking pivotable bracing and tomming members 190 such as are shown in greater detail in FIGURES 14 to 18. Together with the vertical bracing members 120 and/or portable deck members 80, bulkheads, walls, racks, shelves, anchors, etc. of nearly any shape, description or complexity may be erected anywhere on the freight supporting surface. The horizontal bracing or tomming members 190 and portable deck members 80 likewise have on their exposed surfaces a pattern of lines of holes 36 matching that of the deck and vertical members. This permits the use of oblique bracing such as the pivotable auxiliary brace 260 shown in FIGURES 19 and 20 or the attachment of any of the dunnage members of FIGURES 21 to 31.

Figure 2:
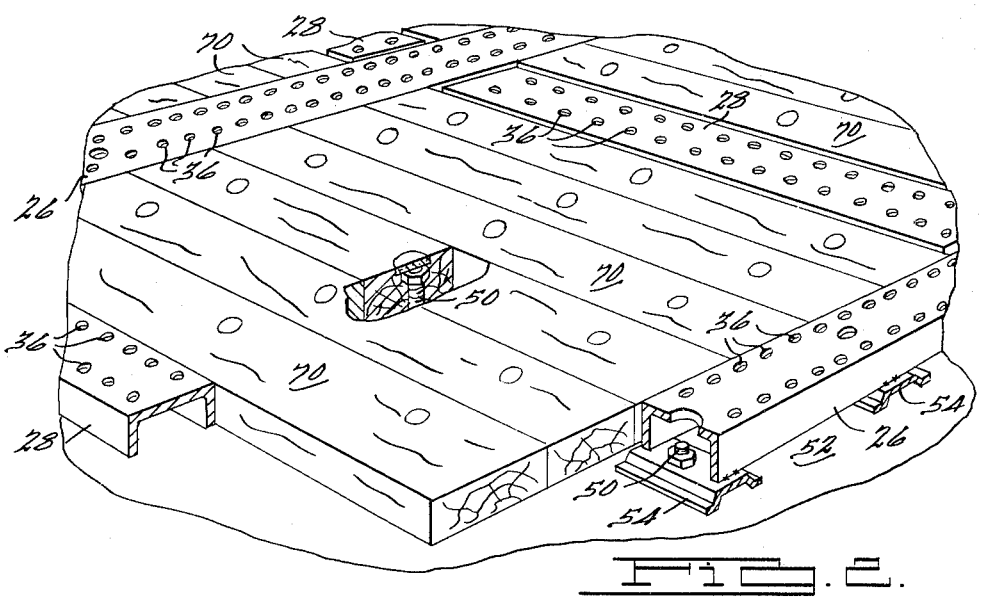
FIGURE 2 is a perspective view, partially in section, showing one manner of installing the permanent deck members utilizing hold-down plates to secure a channel-like sectioned member.
Figure 3:
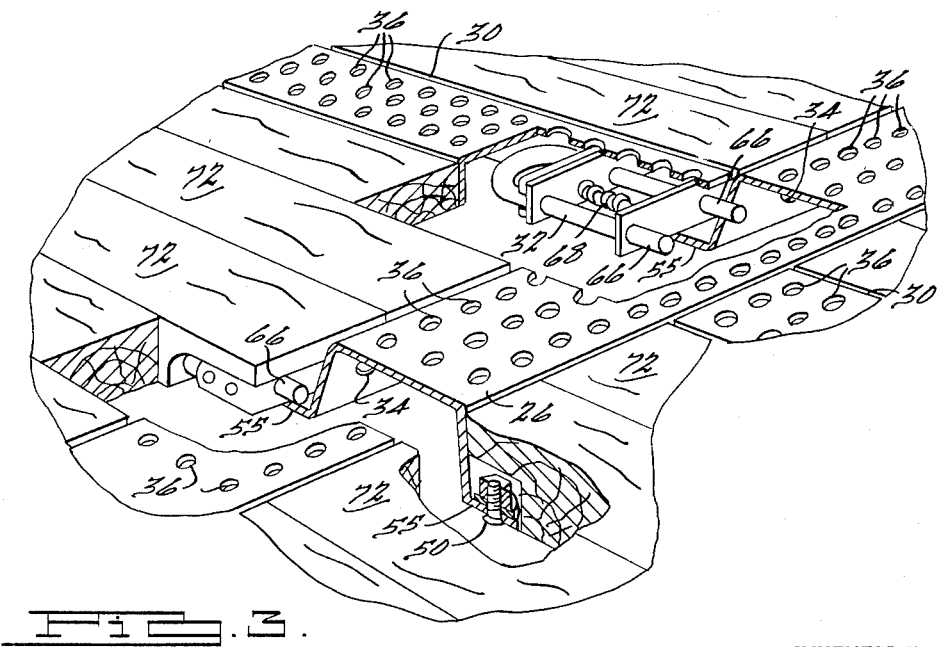
FIGURE 3 is a perspective view similar to FIGURE 2 showing a manner of installing permanent longitudinal deck members having a "hat" section by means of studs welded to the deck together with the use of removable horizontal deck members and planking.

Referring now more specifically to FIGURES 2 to 4, it will be seen that the longitudinal deck members 26 may have a simple channel cross section as shown in FIGURES 2 and 4, or a "hat" section as shown in FIGURE 3, or the shape of any other channel-like structural member. As shown in FIGURES 2 and 4A, a series of stud bolts 50 are welded directly to the metal deck 52. Over the resulting lines of studs a hold down plate 54 is bolted and the longitudinal deck members 26 are edge welded directly thereto. For the deck member arrangement of the third deck and inner bottom, the horizontal deck members are secured in the same fashion. As will appear in FIGURE 3, the longitudinal deck members 26 having a "hat" section are secured by parallel lines of studs 50 welded directly to the deck and which are passed through bolt holes provided in the projecting flange 55. The flange is then slipped over the studs and secured thereto. Also, as shown in FIGURE 4, longitudinal deck member 26, of simple channel cross section, may be provided with welded-on washers 56 and angle brackets 58. An aligned pattern of studs 50 is first welded directly to the deck so that the channel seat plates 56 and channel 26 can be slipped thereover. The seat plates 56 are then welded to the angles 58. Then the angles 58 are welded to the outside of the channel. Lastly, the angles 60 are positioned against channel 26 and angles 58 and welded to the deck. While the latter is a more expensive installation, it offers greater rigidity in the deck and prevents chance displacement of deck members due to loosening of studs or nuts by vibration.

In the two deck member arrangements shown in FIGURE 1 the longitudinal members 26 may be anchored to the metal ship deck by any of the methods shown in FIGURES 2 to 4 and by any other suitable arrangement. In the arrangement shown on the first platform (FIGURE 3), however, the horizontal deck members 30 are removable and are anchored on both ends in holes 34 in the longitudinals by means of a spring biased U-type of clevis 32 wherein the pinlike ends 66 are inserted in the holes 34. The pins 66 are retracted by a screwdriver-like tool, rod or lever inserted through one of the holes 36 so as to engage the closed end of clevis 32 and retract it against the action of spring 68. The use of removable horizontals 30 provides a flush deck and permits the ready re-arrangement of the basic grid patterns on the deck and overhead surfaces to suit special cargo types. The apparatus employing fixed horizontals, however, is less expensive to build and maintain due to the lesser number of latches, tools, etc. required, and it also contributes greater rigidity and load-bearing ability to the metal deck or other freight supporting surface.

With either fixed or removable horizontal deck and overhead members, the interior area of each square of the grid is usually filled in with suitable top decking material, such as the wood planking 70 shown in FIGURES 2 to 4, or synthetic tile, rubber or plastic-covered composition board, and the like. This is to provide a level non-sparking surface on which to stow freight. As shown in FIGURES 2 and 4, the wood planking or plywood can be secured to the metal deck by several lines of studs 50 welded directly to the deck. The latter arrangement contributes increased rigidity and weight carrying capacity to the deck. The overhead grid pattern, however, usually is not filled in this manner. Likewise, as shown in FIGURE 3, with the arrangement utilizing removable horizontals 30, the space inside the square is filled in with removable planking members 72 each member having a U type clevis latch 32 similar to that of the removable horizontal deck members 30. While this arrangement is more versatile, the planking 72 does not contribute rigidity to the deck. If desired, for the stowage of ammunition, the various metal deck and bracing members can be provided with a non-sparking rubber or plastic covering or be made of a non-sparking metal such as aluminum.

*Portable deck members*

On the above described gridlike pattern of holes, portable deck members 80 (FIGURES 5 to 9) are disposed at any intermediate point. The member 80 has a fixed length equal in length to a side of the square, a rectangular cross section made up of a pair of end plates 81 and a channel-like top member 82 (FIGURES 8 and 9) and having in its top surface a line of holes 36 in in-line arrangement, and on either end a pair of opposed, lever-operated lock pins 86, 88 and a fixed load bearing pin 90 therebetween. The bottom plates 81 and the channel 82 are bolted together by carriage type bolts 83 tapped into spacer legs 85 integral with the plates 81. The pins 86, 88 and 90 are inserted in any three holes in a pair of horizontal or longitudinal deck or overhead members 26, 28 or between any parallel pair of vertical or horizontal bracing or tomming members.

The end-lock arrangement for pins 86, 88 is best seen in FIGURES 5 and 7, the pins each being secured to a lever 92 which is pivoted on its inner end on a pin 94 passed through bottom plate 81. Each of pins 86, 88 are secured to lever 92 by a lock nut 100 and large washer 101. Each lever 92 has a transversely projecting lock handle portion 96 having upturned or downturned end 98, the handles 96 passing over or under the other lever 92 to poject on the far side. Across the post-like upper ends 102 of the pins there is secured a transverse extension spring 104 which urges the pins 86, 88 together. The upper ends 102 are supported by bearing against the upper inner surface of the channel web. Since the inner surfaces of each of the lock pins are cut away to form a dog or shoulder 106, the action of spring 104 will cause the latter to engage the inner circumference of each grid hole 36 and lock the member thereto. Insertion and removal of lock pins 86, 88 from the holes are facilitated by the conically tapered lower ends 108. The end lock mechanism on each end of the member is released by simultaneously pressing in on each upturned end 98 of the lock handle portion 96 of levers 92, this movement releasing the shoulders 106 and freeing the pins 86, 88. The end-lock mechanism may also be opened by inserting a round-ended bar, or other like tool, through one of the holes 36 near the intersection of the levers 92 and rotating to spread the inner ends thereof, thereby causing the outer spring-biased ends to move outwardly to release them, or position them for entry into the holes 36 of the deck or bracing members. The fixed pin 90 then is brought into position and the lock pins 86, 88 forced into the holes and the tool withdrawn, release of the inner ends of the levers permitting the spring 104 to move the pins 86, 88 into locking position. As is shown most clearly in FIGURE 5, one of the lock levers 92 has an integral cam surface 110 formed by spot welding a piece of metal to top surface 4 of the lever to bring it level with the top surface of the other lever, the rounded cam surface 110 serving as a smooth tool engaging surface against which the unlocking tool rotates. As will be noted, the portable deck member 80, unlike the permanent deck grid members, has in its top surface 112 only a single line of holes 36. Since the member can be placed at any point in the sides of the squares a double row is usually unnecessary, although any number of lines could be provided, if desired.

*Vertical bracing member*

FIGURES 10 to 13 illustrate very clearly the construction of the telescoping vertical freight bracing member 120. The latter has a main body portion 122 of substantially square cross section having in each of its sides a pattern of holes 36 corresponding in spacing to that of the deck grid members 26, 28. While other cross-sectional shapes may be employed, it has been found that the square section is most versatile. On one end of the square body portion, normally considered the top end of the member, there is a projecting telescope member 124 also having a square cross section. Welded to the outer end of telescope member 124 is a head plate 126 on which are integral pins 128 spaced at twice the distance between holes 36 for insertion in the permanent or portable deck and overhead grid holes 36. On the other end of member 120, there is a projecting lock pin or latch assembly 130 comprising a sleeve 132 of square cross section which is bolted into the end of body section 122 by means of bolts 134. Attached to the outer end of sleeve 132 is a head plate 136 to which are attached two fixed load-bearing pins 128 similar to those on the upper end and which also are spaced apart at twice the distance between grid holes 36. Between pins 128 there is provided a lock pin 140 which extends through a hole 138 in head plate 136 and is an integral part of a pivotable latch lever 142. The latter is pivoted on a hollow shaft 144 which is extended across and held in place in the sleeve 133 by the body section 122. Collars 146 are provided to prevent chance displacement of shaft 144. In order to make the latch lever 142 and its projecting pin 140 self-locking, a small projection or arm 148 on lever 142 is connected to an extension spring 150 having its other end connected to a pin 152 which is extended across sleeve 132 and held in position by the overlapping body section 122.

The lock pin 140 is operated by raising a projecting handle section 156 of lever 142 or depressing handle 157 until the doglike shoulder 158 of lock pin 140 is disengaged from the edge of the hole 36. Similarly, the handle 156 is raised or the handle 157 depressed, to insert the locator pins 128 and the lock pin 140 in the grid holes 36. Release of the handles automatically locks the lower end of the member 120 in position.

The square upper telescope slide member 124 is supported in a square sleeve 170 which is bolted into the end of body section 122 by means of bolts 171, the sleeve 170 having integral end plates 172 and 173 which serve as supports for slide 124. On its inner end, slide member 124 is connected to a round extension shaft 174 by means of an end plate or collar 175 and by a bolt 177 passing diagonally through the slide 124 and extension shaft 174. On its other end, extension shaft 174 is supported by a diagonal spanner-type slip collar 176 having rounded ends which fit into the corners of body 122. A pair of elongated bolts 178 are passed through end plate 173 and through slip collar 176 to compress a compression spring 180 disposed around the extension shaft 174. Tightening or loosening of the nuts on bolts 178 increases or decreases the force exerted by spring 180. The latter is adjusted to exert sufficient force to support the full weight of the member 120 so as to maintain engagement of the pins 128 in the grid holes 36 whether the member is used right side up or upside down.

In use, the vertical bracing member 120 may be installed by first inserting the pins 128 in its upper telescoping end in the holes 36 of the overhead grid, pushing upwardly on the member to telescope it sufficiently to give clearance to the lower lock pin end 130, and then pulling upwardly on latch lever handle 156 to permit the insertion of pins 128, 140 in the holes 36 of the deck grid members. In some cases, the reverse procedure may be preferred. In the latter situation, the latch end is inserted in the deck holes and the member telescoped to provide clearance for the insertion of the pins in the overhead member. Release of the handles 156, 157 in either case automatically locks the member in position.

In some cases, it may be desirable to clamp or bolt auxiliary wooden or metal strips to one or more sides of the vertical member 120 in order to make contact with odd-shaped items of cargo and yet present a straight line of verticals to the next tier of freight or to an aisle. In case the freight is odd-shaped or standardized crates or pallets are incorrectly dimensioned, the added thickness of wood or metal would do away with the necessity for having one vertical out of line with respect to the others in the same line.

Tomming member

The details of horizontal bracing member, or tomming member 190, are shown in FIGURES 14 to 18. Like the vertical bracing member 120, the member 190 has an outer body section 192 of square cross section but it differs in that both ends are telescopically adjustable and hence provided with latch locks on both ends. The telescopic end members, however, are not spring-loaded but rather are locked by a lock pin assembly (FIGURE 16) which passes entirely through the member. It should also be noted that the end lock members are mounted off center (FIGURE 17) at different distances with respect to each center line of the member to permit rotation of the body section 192 to take up progressive increments of slack between one or more grid holes 36. As shown in FIGURE 14, the body section 192 has on either end an inner telescope slide or sleeve 194, square in cross section and provided on two sides with holes 196 having a closer spacing than the holes 36 in outer body section 192, for example, 1.25 inch as against 1.5 inch for the holes 36. The sleeves 194 do not meet in the center of the body 192 so as to permit them to slide inwardly to shorten the member. Likewise, the sleeves 194 can be slid out to lengthen the member. Inside each of the outwardly projecting end portions of sleeves 194 there are two transverse shaft bearing end plates 197 in which is supported a short, round, hollow shaft 198, the latter being located off center in end plates 197 as indicated by dimension lines A and B in FIGURE 17. A lock head assembly 200 is welded to the outer end of shaft 198, and the shaft held in position by means of a bolt 202 extended through end plate 197 and into shaft 198. A washer 204 and lock nut 206 are provided on the inner end of bolt 202 to prevent disengagement of the lock head assembly 200. With this double lock head assembly the body portion 192 can be rotated to take up small increments of slack between the member and freight after the ends have been located in the nearest sets of holes 36 in the vertical members.

The lock head assemblies each have a round body section 203, a pin-supporting outer plate 205, and an inner shaft-attached plate 206. The pin-supporting plate 205 has two straight, integral locator pins 208 (FIGURE 18) and an enlarged hole 210 through which a lock pin 212 is mounted. The latter has a shoulder 214 for engagement under the edge of each of the holes 36 in the vertical members. The lock pin 212 is an integral part of a latch lever 216 having a handle 218 projecting on either side. The lever 216 is pivoted on a hollow shaft 220 which is bolted in place by means of end bolts 222. On a projecting anchor arm 224 there is secured a compression spring 226 having its other end anchored to a bolt 228 in the shaft attached inner head plate 207.

The latch lever 216 can be operated by pulling or pushing on either handle 218 to disengage the shoulder 214 of lock pin 212 from the edge of the hole. Likewise, the pins 208, 212 are inserted by first positioning the straight-sided pins 208 above the grid holes 36 and then moving the handles 218 until pin 212 comes into alignment allowing all three to enter the holes. Release of the handles 218 locks shoulder 214 under the edge of the hole 36.

As pointed out above, the sleeves 194 can be moved inwardly to give clearance for the pins 208, 212 and outwardly to increase the overall length of the tomming member 190. A triangular stop 229 is provided on opposite corners of each end of outer body member 192 to limit outward movement, the stops being anchored by set screws 231. The sleeves 194 have their corresponding corners shaped to pass over the stops, with a shoulder 233 provided to limit outward movement. When the length of the bar has been adjusted and the pins 208, 212 of both ends locked in the holes of the vertical members, a lock pin assembly 234 (FIGURE 16) is passed through opposed holes 36 in body section 192 and opposed holes 196 in sleeves 194. Due to the closer spacing of holes 196 a vernier adjustment of the length of the member is possible. The lock pin 234 (FIGURE 16) comprises a hollow tube 236, a pair of collars 238, and a lock rod 240 passed through tube 236 and both collars. On one end of lock rod 240 there is located a compressible rubber or plastic washer 242 held in place by an outer cap 244. On the opposite, or handle end, of rod 240 there is secured a clevis 246 in which there is mounted an eccentric handle 248, the latter having a round cam surface 250. When the handle 248 is brought in alignment with rod 240, the washer 242 is uncompressed and can be inserted through the holes 36, 196. When, however, the handle is rotated 90° to either of the side positions indicated in solid and dotted outline, the washer 242 will be compressed making it impossible to withdraw it through the holes. The lock pin assembly 234 is simple in operation and can be quickly inserted in the member after it has been mounted in place.

Short pivotable bracing member

The aforementioned fixed deck grid members, portable deck members, vertical bracing members and tomming members are all that are required to erect rectangular mechano-type frameworks on the freight-supporting surfaces. There are occasions, however, when these rectangular structures require additional bracing for adequate strength, for example, at the ends of long bulkheads, in corners, etc. For this purpose a short, telescopically-adjustable bracing member 260 is provided (FIGURES 19 and 20) having a pivotable end fitting 262 on each of its ends. As will appear in FIGURE 20, the main body portion 264 of this member has a channel-shaped cross section. Into the open side of the channel there is welded a continuous bottom plate 266. In the space between the channel web and the plate 266 there are inserted on each end of the channel the tongue 268 of each end fitting 260 and a spacer 270. The spacers 270 are held in place in a small depression 272 formed or machined in the web. The tongue 268 and spacer 270 are secured in position by means of a bolt 274 passed vertically through the channel web, the tongue 268 and plate 266. To provide adjustability each end fitting tongue 268 has a series of holes 276 along its enclosed length. To shorten or lengthen the member the tongue is pushed in or pulled out to the correct position with the tongue holes 276 in alignment with the bolt holes in the web and plate 266. The holes 276 are slotted to facilitate insertion of the pins and provide adjustability in length. The length of tongues 268 and the channel body portion 264 are adjusted so that the member can be adjusted to span the square of the grids either parallel to or on a diagonal.

Each of the end fittings 262 is pivoted on the end of tongue 268, the end of the latter terminating in an integral T-shaped bearing housing 278 through which a tubelike shaft 280 is mounted. Each end fitting 260 has a web 282 connecting two side plates 284 in which the ends of shaft 280 are journalled. The inner edge of each end plate 284 is cut away at 286, 288 to allow greater pivotal movement of each end fitting around shaft 280. Thus mounted, the end fittings 262 permit the bracing member 260 to be secured between a tomming member 190 and a vertical bracing member 120, between two tomming members arranged at right angles (across the corner so formed), obliquely between two vertical bracing members, obliquely between a vertical bracing member 120 and a longitudinal deck or overhead member 26, obliquely between a vertical or horizontal bracing member and a horizontal deck or overhead member 28, vertically between one of deck overhead members 26, 28 and a tomming member 190, or some other position requiring bracing. As will be seen, the side plates 284 extend beyond web 282 so as to fit like a skirt around a vertical or horizontal bracing member or deck member.

The end fittings 260 have pairs of shouldered lock pins 290 which fit in the holes 36 deck or bracing members. The shoulders 291 of each set of pins 290 are disposed in opposite directions to facilitate placement in the holes. Locking of the end fitting to the deck or bracing member is accomplished by a third pin 292 having straight sides which fit snugly into the holes 36. The pin 292 is mounted on a short screw 294 which is threaded in a boss-like projection 295 on web 282. A pivotally mounted handle 296 attached to screw 294 is provided for advancing or retracting the pin 292 into and out of engagement with the hole 36 in the bracing or deck member. The weight of pivoted handle 296 also serves to lock the screw 294 in position. Once seated in the hole, the pin 292 prevents sidewise displacement and disengagement of shouldered lock pins 290. Moreover, the end-fitting cannot be disengaged whether it is attached upside down to a tomming member 190 or in an upright position on a vertical bracing member 120. When it is installed the member 260 is turned so that the shoulders 291 of pins 290 properly engage the grid holes to hold it in position until the pin 292 can be screwed into the locking position.

*Cargo jack*

In the stowing, placement and handling of cargo of all types, but especially in the case of large, weighty items and stacks of palletized freight, it is frequently necessary to snug it down or move it sideways once it has been placed on the freight-supporting surfaces. In many cases where bulkheads, racks, or frames are utilized freight oftentimes must be pushed together and held to enable completion or closing of the bulkhead or the placing of of end members. In other cases where chain or cable ties are to be placed it is necessary to snug up the sides of a bulkhead, rack, frame or bin in order to place the chain or cable around the outside. In still other cases it may be necessary to move an upper crate or pallet in a vertical stack in order to properly place bracing members. In all of these and other situations it is frequently necessary to use a jack. Heretofore it has been necessary to place timbers, chains, cables, or use other auixiliary equipment to form an anchor for the jack. With the gridlike arrangement of deck and overhead members together with the vertical and horizontal bracing members 120, 190, such auxiliary equipment is unnecessary when a jack adapted to be anchored in the grid holes in the deck or bracing member is utilized.

Such a jack is illustrated in FIGURES 21 and 22 of the drawings. The cargo jack 300 has a body comprising a base plate 302 and two parallel, vertical, spaced-apart body side plates 304 welded at right angles to base plate 302. Between body plates 304 there is welded a transverse guide-plate 306 and a transverse brace-guide block 308. In the rectangular space beneath guides 306, 308 there is disposed a pair of parallel jack push bars 310 secured together by transverse spacers 312, 314. Between the outer ends of push bars 310 is a third transverse spacer plate 316 to which is welded a vertical gusset plate 318. Across the ends of push bars 310, spacer plate 316 and gusset plate 318 is a large, flat push plate 320 which contact the freight.

The push bars 310 are operated by a jack handle 322 pivoted on a transverse bolt or shaft 324 carried by vertical body side plates 304. On its lower end, handle 322 has a knife-like fitting 326 having a pin 327 on either side of which is disposed a wheel 328. The latter are rigidly affixed to the fitting 326 and are disposed between spacers 312, 314 so that the pivotal movement of handle 320 causes the wheels 328 to bear against spacers 312, 314 and move push bars 310 into or out of the jack body. If desired, the wheels 328 can be made free to rotate on pin 327. The stroke of handle 320 is somewhat limited because the jack itself is easily moved up to the next set of holes in the deck.

The jack is secured to a deck member by means of two shouldered pins 330 bolted to base plate 302. Locking of pins 330 in deck grid holes 36 is assisted in some cases by means of a pivoted stop plate or foot 332 secured to a transverse bolt or shaft 334 carried in the ends of vertical body side plates 304. In cases where the pins 330 must be inserted in the flush surface of a portable deck member 80, the foot 332 supports the jack on the deck. When the pins 330 are inserted in the grid holes 36 and the jack pushed in the direction of the straight arrow, the forward movement of the jack engages the shoulders 340 of pins 330 under the edges of the grid holes to lock the jack against upward displacement during the power-stroke of the handle 322. Likewise, the jack body is moved to the left to disengage the shoulders 340 of pins 330 from the hole.

As shown in FIGURE 21, the handle 322 is provided with a notched collar type fitting 342 into which various shaped handle levers 344 can be inserted to obtain a comfortable and advantageous lever angle. The jack of this invention, shown in FIGURES 21 and 22, is quickly and easily attached to and detached from any fixed or portable deck or overhead member or to any bracing member to move freight or apply tension to frames, etc. during the application of chains, cables, etc. It is particularly useful when positioning palletized freight or to hold bombs, shells, etc. when applying or adjusting bomb chocks, wedges, etc.

*Bomb or drum wedge assembly*

Figure 23:
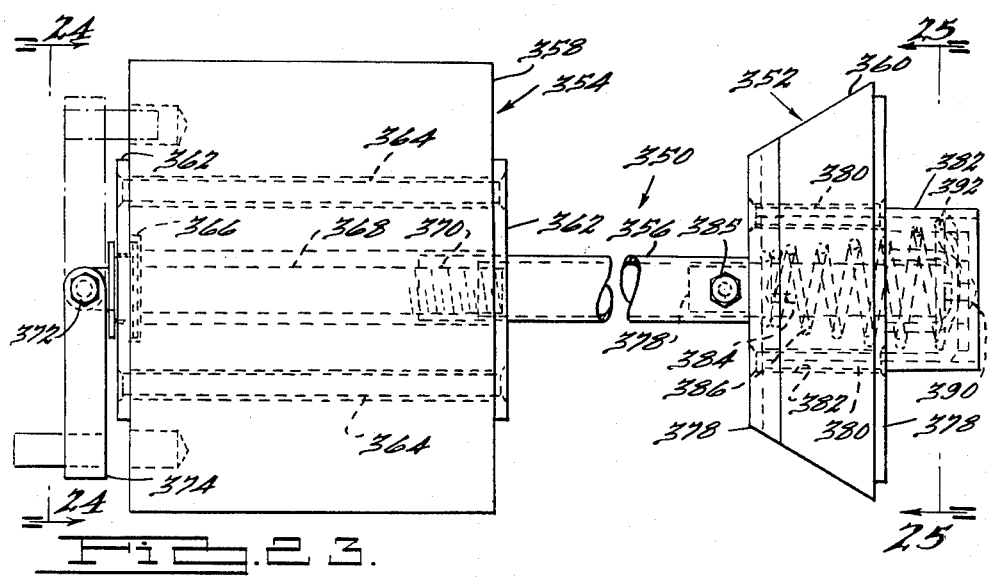
FIGURE 23 is a side elevational view of a spring loaded telescoping bomb or shell wedge assembly for use in connection with the vertical and horizontal bracing members of the foregoing drawings, the wedge of this figure being used to brace and position the bombs in storage racks.
Figure 24:
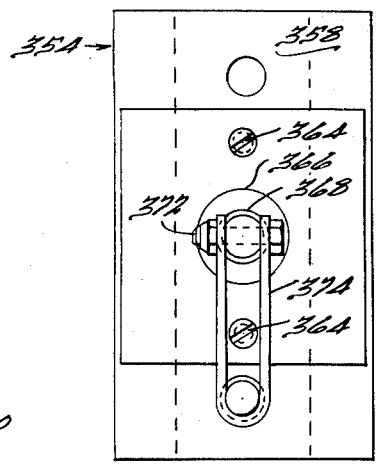
FIGURE 24 is an enlarged end view of the locking mechanism of the bomb wedge assembly of FIGURE 23, the figure being viewed along the line 24—24 of FIGURE 23.
Figure 25:
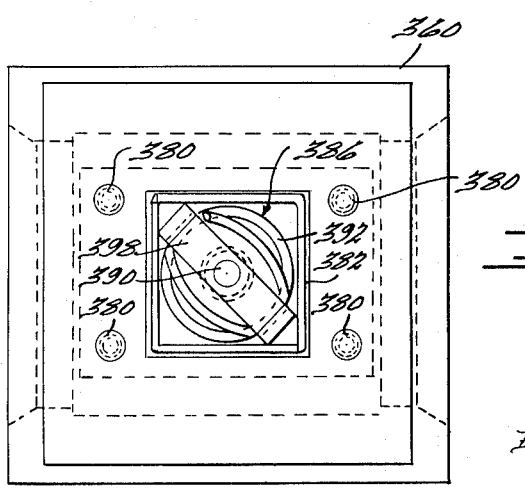
FIGURE 25 is an end view of the bomb wedge of FIGURE 23, the figure being viewed as if along the line 25—25 of FIGURE 23.

With a rectangular framework of vertical bracing members 120 and horizontal bulkheading or tomming members 190 it is a simple matter to construct racks or bulkheads for the storage of round objects such as large aerial bombs, depth charges, torpedoes, rockets, shell casings, large individual artillery shells, etc. or powder cases or drums of gasoline, etc. Several illustrative bomb and shell racks of this type are shown in FIGURE 1. With the round shape of these articles it is sometimes difficult to hold them in position on a straight-sided rack or frame. Moreover, the great weight held by each rack makes it imperative that the bulkhead members not absorb the full weight of a loaded rack. For this purpose, it has been conventional to laboriously construct and install wedges or chocks between adjacent bombs or shells. Such structures constructed of wood must be taken apart, and are likely to be destroyed or damaged in the process, in order to remove individual bombs. For this reason, the present invention provides several types of adjustable bomb wedge assemblies. One type of the latter is shown in FIGURES 23 to 25 while another is shown in FIGURES 26 and 27. The wedges usually are installed vertically between bombs in the interior of a rack to position them against movement. To position a bottom row, or anchor the outside of a row, an adjustable bomb chock assembly is provided, the latter being shown in FIGURES 28 and 29.

The bomb wedge assembly 350 of FIGURES 23 to 25 is a spring-biased locking type having a tapered square-sided anchor section 352 and a rectangular, taper-sided take-up locking wedge assembly 354 connected by a tube-like rod 356. The body 358 of the take-up locking wedge assembly has on each of its fore and back sides a metal plate 362 connected by two riveted long rods 364. Through the front plate 362 is mounted a bearing collar 366 which carries a shaft 368. The inner end 370 of shaft 368 is threaded for engagement inside the end of tube 356. Through the outer end of shaft 368 is passed a small pin or bolt 372 to secure a pivotable handle 374. When the handle is rotated the length of shaft 368 and tube 356 is increased or decreased, as desired. The take-up lock wedge assembly housing 358 has two lock holes 376 drilled therein into which the outwardly projecting peg 378 of handle 374 is inserted to lock the take-up shaft 368, the handle 374 being pivoted about bolt 372 to enter the most convenient of holes 376. The length of shaft 368 need be adjusted only approximately because of the accommodation available in the spring-loaded anchor section 352.

The anchor section comprises the outer tapered housing 360 and two end plates 378, secured together by four bolts 380. Through the outer of plates 378 there is passed a square spring housing 382, open on its outer end, the housing 382 being welded at least to the outer of plates 378. Through the center of spring housing there is passed a short shaft 384 which is journaled in the inner end plate 378 and connected to tube 356 by means of bolt 385. About the shaft 384 is coiled a conically-tapered compression spring 386 which bears on one end against the inner plate 378 and on the other end against a cross plate or bar 388 secured to the end of shaft 384 by a carriage bolt 390. The large outer end coils 392 of spring 386 support the outer end of housing 382 on shaft 384. Thus mounted, the rectangular or square-sided anchor body 360 can be moved back and forth on shaft 384 with the spring 386 keeping a tension on tube 356 to hold the entire wedge assembly in position. The wedge assembly of FIGURES 23 to 25 is placed vertically between bombs or shells in two rows thereof on a rack, the anchor 352 usually being placed on the bottom and the locking assembly 354 on top to be accessible for take-up.

The wedge assembly 390 of FIGURES 26 and 27 has two tapered wedge sections for objects having rounded surfaces on either end, for example, the large aerial bombs 470 shown in FIGURE 1. The assembly 390 has a short lower anchor section 392 of square cross section and an elongated upper wedge 394 of rectangular square or round cross section connected only by a chain 396. The lower anchor assembly 392 has a tapered outer body 398 and two end plates 400 separated by a spacer 402, the plates 400 being fastened together by four bolts 404. The chain 396 is passed through a hole 406 in the inner of plates 400 and fastened to a U-shaped clevis 408 secured to a plate 410 which is freely slidable in the cavity. On the inner end of the enclosed length of chain 396 there is provided an anchor collar 412 to position the small end of a short, conically tapered compression spring 414. The chain 396 passes through collar 412 and the spring 414, the latter acting through plate 410 provides resilience and self-adjusting qualities to the assembly.

The chain 396 passes through an integral passageway 416 in the interior of upper wedge housing 418. On the projecting end of chain 396 there is provided an eye pin 420 having a straight pin section 422 for insertion through holes 424 in passageway 416. The length of chain 396 is adjusted by pulling it through upper wedge 394 until a link is aligned with holes 424 or 425. In the wall of passageway 416 there are provided two pairs of aligned holes 424, 425 which are located at 90 degrees with respect to the other and spaced apart at about one-half link. Insertion of pin 422 through either of the pairs of holes 424, 425, and through the aligned link locks the wedge 394 against inward and outward movement. The notch 427 facilitates the placement of pin 422. The pressure exerted by spring 414 also tends to keep the pin 422 in the hole.

The outer surfaces of upper wedge 394 are covered, if desired, with a non-sparking layer of coating 426 of rubber or plastic to insulate it from the metal of the bomb, shell, etc. This is to reduce the danger of sparks due to static electricity. The wedge of FIGURES 23 to 25 can be similarly covered, if desired. In use the wedge assembly 390 is usually used in a vertical position with the wedge 392 on the bottom. A strong pull upward on chain 396 while forcing the wedge 394 down with a foot enables the user to place pin 422 in the correct hole for snug fit. The excess chain then is stowed in the inside of wedge 394, the weight and volume of the excess chain serving to prevent disengagement of pin 422.

Adjustable bomb chock

As pointed out above, the lower row of a rack of bombs, or the end bombs in each row on the rack, can be positively suported by a chock anchored into the holes 36 of the deck member 26, 28 or in the holes of a horizontal bracing or tomming member or members placed under any row of the rack. As shown in FIGURES 28 and 29 the chock 440 comprises a base plate 442, two vertical, outer side plates 444, 446, and a vertical end plate 448 all welded together. The plates 444, 446 are cut on a taper, as at 450, to permit movement of a pivoted chock plate 452. The chock plate 452 is secured to a pair of tapered gusset plates 454, 455, and the latter are pivoted on a rod 456 passed through plates 444, 446. The gusset plates 454, 455 are connected by an inclined plate 458. On its narrow end 459, gusset plate 455 is pierced with two side-by-side holes 460. The rear body plate 446 is likewise provided with two arcuate-shaped lines of holes 462 to permit the locking of end 459 in any of a number of positions by passing a bolt or bolts through the matched holes 460, 462. For this purpose a self-locking bolt such as that shown in FIGURE 16 can be employed.

The chock 450 is positioned on a deck channel or on a bracing member by first placing the shouldered pin 466 attached to base plate 442 in one grid hole 36 and then the locking pin 464 in another. Chance displacement of shouldered pin 466 is prevented by so locating the pins 464, 466 that the shouldered pin 466 can not be disengaged while locking pin 464 is engaged in a hole. The weight of a heavy bomb 470 prevents upward movement of locking pin 464.

Hook and shackle

As pointed out above, it is sometimes necessary to utilize chains or cables to tie down freight or to secure the sides of bins or boxes or small articles. FIGURE 1 shows just such a bin or box secured together by vertical and horizontal cables anchored in the deck members 26, 28 and in the vertical bracing members 120. The hook and shackle assembly 480 for this purpose, shown in FIGURES 30 and 31, comprises an anchor or body section 482, a pivotable shackle 484 attached thereto, and a stop pin 485 extending on one side of the anchor 482. The anchor 482 has a flat body 486 having the general shape of an equilateral triangle having one apex 488 cut off or truncated. Attached to, or an integral part of, the body 486 is a hook 490 having a smoothly rounded edge 492. Near the intersection of the hook 490 with the anchor body 486, the hook has an enlarged portion or shoulder 494 to prevent too much lateral displacement of the hook in hole 36. With this shape the anchor 482 may be secured to a deck or bracing member by rocking it on the truncated edge 488 and inserting the hook 490 in the hole 36. A pull exerted on the shackle 484 is transmitted to the anchor through the pin 496. Such a pull is taken up by the anchor surface 498 and the hook 490. Release of the tension on shackle 484 causes it to strike the stop pin 485 causing the anchor body 486 to rock on the truncated corner surface 488 to release the hook 490.

This self-releasing feature, greatly facilitates removal of the hook and prevents incorrect placement thereof since a pull in the wrong direction immediately disengages the hook. While the drawings show a chain 500 secured to the shackle 484, it is to be understood that a cable, rope or rod can also be attached thereto.

*Auxiliary T member*

As pointed out above the portable deck members 80 and rotatable tomming members 190 make for flexibility with the grid pattern of fixed deck and overhead members 26, 28. These members make it possible to erect the vertical bracing members 120 at intervals corresponding to the spacing of holes 36 anywhere on the freight supporting surface. Instances have occurred, however, where a tier or row of freight "A" ends in the interior of a square (see dotted outline FIGURE 34). In such instances, it is possible to mount a number of the portable deck members 80 on the overhead in side-by-side relation to receive the upper ends of vertical bracing members 120 on each side of the corner. On the deck, however, the freight and the first portable member 80 interfere with the placement of another intersecting portable deck member 80 to brace the other side "X" of the corner. For this situation, the portable "T" member 510 is provided. The member 510 comprises a "head" section 512 secured on top of a "leg" section 514. The head section 512, which contains the latch pins and locking assembly, comprises a wing-shaped base plate 516 welded to a top plate 518 of the "leg" section 514, two upstanding side plates 520 welded to top plate 516, a transverse brace block 522 and end plate 523, and on the bottom side of the extremity of each wing a fixed, straight-sided pin 524. In the center of plate 516 there is provided a slotted hole 526 in which is disposed a latch-operated lock pin 528 having a shoulder 530 for engagement with the edge of a deck grid hole 36 in which it is inserted. The pin 528 is secured to a slide plate 532 by means of a nut threaded over the upper end of the pin. The plate 532 is provided with an upstanding, welded on spacer-guide plate 534 to guide the plate 532 in its back and forth sliding movement between side plates 520.

A bolt 538 is passed through both side plates 520 to serve as a pivot for a tongue-shaped latch-operating lever 540. The latter is welded to a sleeve 542 which encircles bolt 538. Also welded to sleeve 542 is a short, downwardly-depending arm 544 which makes contact with a spring-retainer collar 546 in contact with a coiled compression spring 548 carried by a rod 550. The latter is supported by the brace block 522 and end plate 523 with the other end of spring 548 bearing against a second spring-retainer collar 552 and slide plate 534. With this arrangement, the spring 548 is full floating and always acts to urge the plates 516, 534 and its sliding mechanism to the left or locking position. The spring 548 also normally acts to depress the lever 540 to the closed position. The shoulders 554 on either side of the tongue bear against plate 534 and prevent accidental displacement of the pin 528 and its sliding mechanism toward the right or to the unlocked position.

The member 510 is installed in deck or overhead grid holes by raising the tongue-like lever 540 until the shoulders 554 are clear of plate 534, the pin 528 is grasped by its nut and pushed to the right, all three of pins 524, 528 then are pushed into holes, and the lever 540 released. The member is then locked into position with all load being borne by shoulders 554 instead of by spring 548.

The "leg" section of the T-shaped member comprises three plates 518, 556 welded to form a rectangular box-shaped member. The top plate 518 is provided with five holes 36 arranged in a square with one hole in the center so that the three pins of vertical bracing members 120 can be inserted in either of two directions. As will appear most clearly in FIGURE 34 the member 510 will be placed with the wing-shaped "head" 512 over the top surface of the member 80. The "leg" section 514 rests flat on the deck or planking members 70 to serve as a firm anchor for a corner vertical member 120.

*Cargo snugger attachment*

As mentioned hereinbefore, in some instances odd-shaped articles of freight or cargo, or off-dimensioned crates, pallets, etc., make it impossible to insure contact with a straight line of vertical bracing members 120. In some instances, as explained hereinbefore, this contingency can be taken care of by gluing or bolting a piece of wood or metal to the verticals but this requires a series of members with various thicknesses of strips. The attachment 560 shown in FIGURES 35 and 36, however, can be attached to ⅓ or ½ of the vertical members available in the ship and the attachment so designed so as to be adjustable outwardly a distance to cover most commonly occurring contingencies.

The snugger attachment 560 comprises a U-shaped frame made by welding two side plates 562 and a front plate 563 together at right angles. The frame may be made sufficiently long to cover substantially the entire body section 122 of the vertical bracing members 120 or they may be made a fraction of the body length so that one or more may be installed as required. The frame is slipped over the outside of the square body section 122 (FIGURE 35). Adjustability is provided by an angularly aligned pattern of holes 564 on each side of the frame, preferably near both the top and bottom ends. As shown in the side view of FIGURE 36 the centers of holes 564 are disposed on a line intersecting the longitudinal center line of side plate 562 so as to provide incremental adjustment in an outward direction. The holes 564 are spaced apart at the same center distance as the holes 36 in the body section 122 of the bracing member or rather the distance between like holes in the frame must be a multiple of the spacing between holes 36. A suitable means for securing the frame of the snugger 560 to the bracing member 120 is similar to the lock bolt 234 shown in FIGURE 16. At least two such bolts usually will be required. Separate lock bolts inserted from each side of the member could be utilized, if desired. At least one of the holes 564 preferably should be located on the longitudinal center line of the side plates 562 in order to permit retraction of the frame to bring front plate 563 into contact with the body 122 of the bracing member so that such members can be used without extension of the snugger where this is necessary.

The apparatus of this invention is installed in a freight-transporting vehicle, such as a ship, or in a freight-storage area, such as a warehouse, with the fixed and/or removable deck members 26, 28 first being affixed to a deck, floor or wall most advantageously employed at a spacing found most convenient. In a ship, for instance, a spacing of about four feet has been employed because such a pattern permits breaking up of the cargo into self-contained units with ample aisle space for access. Most logically, the bulky freight or cargo items are then simply moved into position and secured by erection of an appropriate number of vertical and horizontal bracing members. The latter are strong and so light in weight as to be easily handled and installed by one man. Since the dimensions of crates, pallets, boxes, etc., even though of standardized design, vary as much as 1 or 2 inches, it can be readily appreciated that the final length of rows or tiers of such items are seldom known until they are laid end to end and side by side. This is no serious disadvantage with the apparatus of this invention since the grid-like pattern of holes in the deck and overhead members permit the erection of verticals at very small intervals. For example, the grid holes 36 of the deck and overhead members of the installation shown in FIGURE 3 were located on 1.5 inch centers. There are, however, instances where a corner or an entire row or tier terminate at a point within the square defined by the intersecting deck members. The apparatus of this invention provides portable deck members, auxiliary T members and rotatable off-center horizontal bracing members to take care of these contingencies. By locating one or more portable deck members and/or T members at any point within or between the intersections of the grid members it is possible to locate verticals, for example at 1.5 inch intervals. The cargo snugger attachment on some of the vertical members takes care of situations where the verticals must be in a straight line for aisle purposes, etc. The horizontal bracing members can then be installed and rotated to take up increments of less than 1.5 inches in order to insure lateral contact with the cargo or freight. These latter two elements eliminate the use of most of the wedges, shims, custom-fitted braces, etc., now employed in freight dunnage. While it may sometimes be necessary to employ a few such items in connection with the apparatus of this invention to insure snug fit against occasional odd-shaped braces of freight, it may be appreciated that the number required is drastically reduced and their placement simplified by the many support members afforded by the deck and bracing members of this invention.

With the apparatus of this invention, small or numerous identical items of freight are handled by first building open-sided bins, racks, etc., piling or stacking the items therein; then completing the enclosure with the requisite verticals, horizontals, and, if desired, boards or sheets of plywood or cardboard; and, if necessary, encircling the bin, rack, etc., with snugging cables or chains employing the convenient hook and shackle assembly disclosed herein. Bombs, cans, drums, etc. are stacked in racks and secured in position therein by means of the chock and wedge assemblies of this invention.

Final placement of any of these types of freight or cargo is facilitated by use of the cargo jack shown in the drawings, the latter being used wherever necessary to eliminate small dead spaces between rows, stacks, etc. and to move cargo items into otherwise inaccessible areas of bulkheads, behind pipes, support columns and other permanent obstructions.

Breakout of portions or individual items of freight or cargo is much simplified with the apparatus of this invention. The easy placement of verticals makes it a simple matter to lay out adequate aisles and lanes between dissimilar types of cargo. After removal of a portion of the cargo the bracing members are moved in to engage the remaining items of freight in the row or stack, or they may be removed entirely and stored at a convenient point near a hatchway or door, etc. Stowage of the unneeded bracing members entails nothing more than inserting the pins of the bracing members in unused, out-of-way deck members to form a compact vertical or horizontal row or stack of members. This same self-stowing feature also facilitates loading, the reserve members being stowed near the hatchway, elevator or entryway where they are always available for use as the loading proceeds from the far corners and progresses toward the entryway.

While only a few preferred embodiments of the invention have been disclosed herein it is to be understood that further variations and modifications can be made without departing from the spirit and scope of the appended claims.

What is claimed is:

1. A freight engaging member adapted to extend between and be supported at opposite ends on support structure, said member comprising an elongated body having a longitudinally extending central axis and adapted to engage freight, a head at each end of said body and each including means adapted to connect said head to said support structure and hold said head against rotation relative thereto, and means mounting said heads on said body at opposite ends thereof for rotation relative to said body about a common axis offset from said central axis.

2. A freight engaging member adapted to extend between and be supported at opposite ends on support structure, said member comprising an elongated body having a plurality of longitudinally extending flat sides adapted to engage freight, a head at each end of said body and each including means adapted to connect said head to said support structure and hold said head against rotation relative thereto, and means mounting said heads on said body at opposite ends thereof for rotation relative to said body about a common axis offset different distances from at least two of said sides of said body, said axis being offset different distances from each of said plurality of sides of said body.

References Cited by the Examiner

UNITED STATES PATENTS

| | | | |
|---|---|---|---|
| 458,515 | 8/91 | Boyle | 214—10 |
| 1,833,764 | 11/31 | Tremblay et al. | 105—369 |
| 1,838,472 | 12/31 | Barrett | 105—369 |
| 2,268,394 | 12/41 | Hebert | 104—369 |
| 2,294,795 | 9/42 | Moses | 105—369 |
| 2,497,683 | 2/50 | Nampa et al. | 105—369 |
| 2,525,736 | 10/50 | Taylor | 85—2.4 |
| 2,575,550 | 11/51 | Fahland | 105—369 |
| 2,611,495 | 9/52 | Weaver | 214—10 |
| 2,679,214 | 5/54 | Nampa | 105—369 |
| 2,688,894 | 9/54 | Modrey | 85—2.4 |
| 2,834,304 | 5/58 | Chapman et al. | 105—369 |
| 2,873,695 | 2/59 | Tobin | 105—369 |

MILTON BUCHLER, *Primary Examiner.*

LEO QUACKENBUSH, EUGENE G. BOTZ, *Examiners.*